(12) United States Patent
Budde

(10) Patent No.: US 11,576,410 B2
(45) Date of Patent: Feb. 14, 2023

(54) SURFACE-REACTED CALCIUM CARBONATE AS EXTRUSION AID

(71) Applicant: OMYA INTERNATIONAL AG, Oftringen (CH)

(72) Inventor: Tanja Budde, Brittnau (CH)

(73) Assignee: OMYA INTERNATIONAL AG, Oftringen (CH)

( * ) Notice: Subject to any disclaimer, the term of this patent is extended or adjusted under 35 U.S.C. 154(b) by 221 days.

(21) Appl. No.: 16/310,504

(22) PCT Filed: Jun. 14, 2017

(86) PCT No.: PCT/EP2017/064579
§ 371 (c)(1),
(2) Date: Dec. 17, 2018

(87) PCT Pub. No.: WO2017/220412
PCT Pub. Date: Dec. 28, 2017

(65) Prior Publication Data
US 2019/0320691 A1    Oct. 24, 2019

(30) Foreign Application Priority Data
Jun. 24, 2016 (EP) .................... 16176267

(51) Int. Cl.
*A23L 7/17* (2016.01)
*A23P 30/34* (2016.01)
(Continued)

(52) U.S. Cl.
CPC .............. *A23L 7/17* (2016.08); *A23P 30/34* (2016.08); *B65D 65/463* (2013.01);
(Continued)

(58) Field of Classification Search
CPC ........ A23L 29/212; A23L 7/17; A23L 29/294; A23L 29/262; C01P 2004/61; C01P 2004/51; C09C 1/022
See application file for complete search history.

(56) References Cited

U.S. PATENT DOCUMENTS 5,366,748 A    11/1994 Villagran et al.
6,210,741 B1    4/2001 Van Lengerich et al.
(Continued)

FOREIGN PATENT DOCUMENTS

CN    105495354 A    4/2016
EP    2 264 108    12/2010
(Continued)

OTHER PUBLICATIONS

Gane, Patrick A. C., Kettle, John P., Matthews, G. Peter and Ridgway, Cathy J., "Void Space Structure of Compressible Polymer Spheres and Consolidated Calcium Carbonate Paper-Coating Formulations", Industrial and Engineering Chemistry Research, vol. 35, No. 5, 1996, pp. 1753-1764.
(Continued)

*Primary Examiner* — Erik Kashnikow
*Assistant Examiner* — Assaf Zilbering
(74) *Attorney, Agent, or Firm* — Sheppard, Mullin, Richter & Hampton LLP

(57) ABSTRACT

A method is described of using a surface-reacted calcium carbonate as an extrusion aid for the production of a puffed polysaccharide-based material, excluding fibrillated cellulose-containing materials. In embodiments, the surface-reacted calcium carbonate is a reaction product of ground natural calcium carbonate (GNCC) or precipitated calcium carbonate (PCC) with carbon dioxide.

23 Claims, 9 Drawing Sheets

(51) Int. Cl.
 *B65D 65/46* (2006.01)
 *C01F 11/18* (2006.01)
 *C09C 1/02* (2006.01)

(52) U.S. Cl.
 CPC ............ *C01F 11/185* (2013.01); *C09C 1/022* (2013.01); *A23V 2002/00* (2013.01); *C01P 2004/51* (2013.01); *C01P 2004/61* (2013.01); *C01P 2006/12* (2013.01)

(56) References Cited

U.S. PATENT DOCUMENTS

| | | | |
|---|---|---|---|
| 6,277,423 | B1 | 8/2001 | Orosa et al. |
| 7,431,954 | B2 | 10/2008 | Ballman et al. |
| 7,638,017 | B2 | 12/2009 | Gane et al. |
| 2004/0020410 | A1 | 2/2004 | Gane et al. |
| 2005/0238760 | A1 | 10/2005 | Ballman et al. |
| 2009/0291179 | A1 | 11/2009 | Nakano et al. |
| 2012/0064209 | A1* | 3/2012 | Ardisson-Korat ...... A23P 30/34 426/334 |
| 2012/0111520 | A1* | 5/2012 | Shen ................... D21H 17/675 162/181.9 |

FOREIGN PATENT DOCUMENTS

| | | |
|---|---|---|
| EP | 2 264 109 | 12/2010 |
| JP | 63-196230 A | 8/1988 |
| WO | 00/39222 | 7/2000 |
| WO | 2004/083316 | 9/2004 |
| WO | 2005/121257 | 12/2005 |
| WO | 2009/074492 | 6/2009 |
| WO | 2014/012225 A1 | 1/2014 |

OTHER PUBLICATIONS

International Search Report and Written Opinion dated Aug. 2, 2017 in corresponding International Patent Application No. PCT/EP2017/064579, filed Jun. 14, 2017, 12 pages.

Office Action dated Nov. 24, 2020 in corresponding Japanese Patent Application No. 2018-567274, 6 pages.

* cited by examiner

SURFACE-REACTED CALCIUM CARBONATE AS EXTRUSION AID

CROSS-REFERENCE TO PRIOR APPLICATIONS

This application is a National Stage of PCT/EP2017/064579, filed Jun. 14, 2017, and designating the United States (published on Dec. 28, 2017, as WO 2017/220412 A1), which claims priority under 35 U.S.C. § 119 to European Patent Application No. 16176267.9, filed Jun. 24, 2016, each hereby expressly incorporated by reference in its entirety and each assigned to the assignee hereof.

The present application relates to the use of surface-reacted calcium carbonate as extrusion aid for the production of puffed polysaccharide-based materials.

Puffed polysaccharide-based materials obtained by means of extrusion cooking are very often used as or processed into food products for human consumption (e.g. breakfast cereals or snacks) or for animal consumption (e.g. pet food). However, the use of these polysaccharide-based materials is also common for non-food applications, particularly for packaging materials.

To obtain a puffy structure with a porous or foamy appearance, such materials are frequently produced from starch-containing ground materials or other polysaccharide-containing ground materials which are then subjected to an extrusion process. Suitable starting materials thus include groat, semolina or flour of barley, corn (maize), oats, rice, rye, spelt, wheat, amaranth, quinoa, millet and the like. In a typical process, the ground starting material is fed to the inlet of an extruder and then heated to temperatures of 100° C. or higher. After leaving the extruder through a die, water and other volatiles contained in the starting material evaporate immediately which is associated with a cross-sectional or volume expansion of the extrudate. Said expansion may be described by the so-called expansion index F, wherein a high expansion index indicates a higher porosity and a lower density of the extrudate.

The terms "puffy" or "puffed" as used throughout this application refer to the property of a solid material providing the skeletal construct of a porous or foamy structure obtained through porous expansion of a suitable starting formulation. Preferably, expansion is achieved by evaporation of a liquid (e.g. water) embedded in said starting formulation using elevated temperatures and/or rapid pressure decrease.

In the art, the extrusion of polysaccharide-containing materials for the production of puffed extrusion products is well-established. An overview of suitable methods and raw materials is provided by R. Guy in "Extrusion Cooking", Woodhead Publishing Ltd. and CRC Press LLC, 2001.

Efforts have been made in order to modify or control the porosity and further characteristics of polysaccharide-based food products. U.S. Pat. No. 6,277,423 suggests the use of calcium carbonate as leavening in extruded dough compositions. However, the leavening described therein was given to have a larger particle size to prevent it from evolving gas before frying the extrudate. U.S. Pat. No. 7,431,954 discloses the use of calcium carbonate to provide calcium fortification in extrusion cooked food products. However, it is described that calcium carbonate may cause over leavening which can actually result in unwanted under-expansion of the extrudate.

Accordingly, there is still a need for the provision of improved extrusion cooked puffed materials and improved processes for their production.

One object of the present invention may therefore be seen in the provision of puffed extrusion cooked materials with an increased expansion index. In this respect, there is still a need for the provision of food products with a lighter and fluffier mouthfeel.

Especially also in the field of packing materials, there is still a need for lighter and environmentally friendly packaging materials.

Another object may be seen in the provision of puffed extrusion cooked food products with improved crispness.

Still another object may be seen in the provision of a puffed extrudate having a smoother or more uniform texture.

Still another object may be seen in the provision of a puffed extrudate with increased hardness. In case of puffed food, increased hardness may positively affect the mouthfeel. In the field of packaging materials, increased hardness is associated with improved stability and safety of transported goods.

Still another object may be seen in the provision of a material and cost saving process for the production of puffed polysaccharide-based materials.

The foregoing and other problems may be solved by the subject-matter as defined herein in the independent claims.

A first aspect of the present invention relates to a process for the production of a puffed polysaccharide-based material, the process comprising the following steps:

(a) providing at least one polysaccharide-containing ground material excluding fibrillated cellulose-containing materials;

(b) providing at least one extrusion aid;

(c) combining the polysaccharide-containing ground material provided in step (a) and the extrusion aid provided in step (b) to obtain a mixture; and (d) puffing the mixture obtained in step (c) by means of an extruder to obtain a puffed polysaccharide-based extrudate;

characterized in that said extrusion aid provided in step (b) is a surface-reacted calcium carbonate, wherein the surface-reacted calcium carbonate is a reaction product of ground natural calcium carbonate (GNCC) or precipitated calcium carbonate (PCC) treated with $CO_2$ and one or more $H_3O^+$ ion donors and wherein the $CO_2$ is formed in situ by the $H_3O^+$ ion donors treatment and/or is supplied from an external source.

The use of (unmodified) calcium carbonate as additive in extruded or puffed cereal-based snacks is already known. However, most of the described food products contain calcium salts for fortification purposes. U.S. Pat. No. 6,210,741 discloses a method for preparing a grain-based extrudate wherein the starting blend can comprise about 1 to 10% of calcium fortification (e.g., calcium carbonate or calcium phosphate). In a similar manner, U.S. Pat. No. 5,366,748 discloses a method for the production of cereal grain-based food products, wherein calcium carbonate was added as a calcium fortification source.

The inventors of the present invention surprisingly found that the use of surface-reacted calcium carbonate as extrusion additive provides improved characteristics to puffed polysaccharide-based materials obtained by means of extrusion. For this purpose, a mixture comprising a suitable puffable material and surface-reacted calcium carbonate are subjected to an extrusion step, i.e. at elevated temperatures and elevated pressure. Suitable puffable materials may be, for example, groat, semolina or flour of barley, corn (maize), oats, rice, rye, spelt, wheat, amaranth, quinoa, millet and the like excluding fibrillated cellulose-containing materials (i.e. materials containing microfibrillated cellulose, materials containing nanofibrillated cellulose, materials containing nano-crystalline cellulose and/or fractionated cellulosic materials referenced as noil or crill). The surface-reacted calcium carbonate is a reaction product of ground natural calcium carbonate (GNCC) or precipitated calcium carbonate (PCC) treated with $CO_2$ and one or more $H_3O^+$ ion donors. While not wishing to be bound by any theory, it is believed that the surface-reacted calcium carbonate serves as a so-called "bubble nucleating agent" which provides large surfaces and enhances or accelerates the evaporation of liquids, such as water, contained in the raw mixture at the outlet of the extruder.

Improved characteristics of the puffed extrudate obtainable by means of the inventive process include increased expansion indices, which may be used to describe the cross-sectional or volume expansion of the extrudate after passing the outlet of an extruder. Further to this, the products obtainable according to the inventive extrusion process were found to provide improved results in organoleptic panel testing, for example improved crispness or a more uniform surface.

Another aspect of the present invention relates to the use of a surface-reacted calcium carbonate as extrusion aid for the production of a puffed polysaccharide-based material excluding fibrillated cellulose-containing materials, wherein the surface-reacted calcium carbonate is a reaction product of ground natural calcium carbonate (GNCC) or precipitated calcium carbonate (PCC) treated with $CO_2$ and one or more $H_3O+$ ion donors and wherein the $CO_2$ is formed in situ by the $H_3O^+$ ion donors treatment and/or is supplied from an external source.

Still another aspect of the present invention relates to a puffed polysaccharide-based material excluding fibrillated cellulose-containing materials, obtainable according to the inventive process.

The following terms used throughout the present application shall have the meanings set forth hereinafter:

The term "solid" refers to a physical state of a material. Unless indicated otherwise, this physical state is to be observed at a temperature of 20° C.

The term "surface-reacted" (e.g. surface-reacted GNCC or PCC) in the meaning of the present application shall be used to indicate that a material has been subjected to a process comprising partial dissolution of said material upon acidic treatment (e.g., by use of water soluble free acids and/or acid salts) in an aqueous environment followed by a crystallization process which may occur in the absence or presence of further crystallization additives. The term "acid" as used herein refers to an acid in the meaning of the definition by Brønsted and Lowry (e.g. $H_2SO_4$, $HSO_4^-$).

Additionally or alternatively, a "surface-reacted" material may be characterized by an increased intraparticle intruded specific pore volume as compared to the untreated starting material (i.e. GNCC or PCC). Said increased pore volume or porosity is a result of the dissolution and recrystallisation process during its formation. Usually, the starting materials do not show any or only low internal porosity.

Where an indefinite or definite article is used when referring to a singular noun, e.g. "a", "an" or "the", this includes a plural of that noun unless anything else is specifically stated.

Where the term "comprising" is used in the present description and claims, it does not exclude other elements. For the purposes of the present invention, the term "consisting of" is considered to be a preferred embodiment of the term "comprising". If hereinafter a group is defined to comprise at least a certain number of embodiments, this is also to be understood to disclose a group, which preferably consists only of these embodiments.

Terms like "obtainable" or "definable" and "obtained" or "defined" are used interchangeably. This, for example, means that, unless the context clearly dictates otherwise, the term "obtained" does not mean to indicate that, for example, an embodiment must be obtained by, for example, the sequence of steps following the term "obtained" though such a limited understanding is always included by the terms "obtained" or "defined" as a preferred embodiment.

Whenever the terms "including" or "having" are used, these terms are meant to be equivalent to "comprising" as defined hereinabove.

Further definitions of terms and parameters referred to in the present applications can be found in the experimental section together with, as far as necessary, the measuring methods.

Advantageous embodiments of the inventive extrusion process, the use of surface-reacted calcium carbonate in said process and the corresponding product are defined in the corresponding subclaims.

According to one embodiment of the present invention, (i) the polysaccharide is a homopolysaccharide and preferably is starch; and/or (ii) the polysaccharide-containing ground material provided in step (a) comprises barley, corn (maize), oats, rice, rye, spelt, wheat, amaranth, quinoa, millet or mixtures thereof, preferably the polysaccharide-containing ground material is selected from groat, semolina or flour of barley, corn (maize), oats, rice, rye, spelt, wheat, amaranth, quinoa, millet or mixtures thereof, and more preferably the polysaccharide-containing ground material is corn (maize) flour, wheat flour, nut flour or a mixture thereof.

According to another embodiment of the present invention, the one or more $H_3O^+$ ion donors are selected from (i) strong acids having a $pK_a$ of 0 or less at 20° C.; and/or (ii) medium-strong acids having a $pK_a$ value from 0 to 2.5 at 20° C.; and/or (iii) weak acids having a $pK_a$ of greater than 2.5 and less than or equal to 7 at 20° C., associated with the ionisation of its first available hydrogen, wherein a corresponding anion is formed on loss of this first available hydrogen capable of forming a water-soluble calcium salt, and wherein at least one water-soluble salt, which in the case of a hydrogen-containing salt has a $pK_a$ of greater than 7 at 20° C., associated with the ionisation of the first available hydrogen, and the salt anion of which is capable of forming water-insoluble calcium salts, is additionally provided.

According to still another embodiment of the present invention, the surface-reacted calcium carbonate is obtained by a process comprising the following steps:

(a) providing a suspension of ground natural calcium carbonate (GNCC) or precipitated calcium carbonate (PCC);

(b) adding at least one acid having a $pK_a$ value of 0 or less at 20° C., or having a $pK_a$ value from 0 to 2.5 at 20° C. to the suspension provided in step (a); and (c) treating the suspension provided in step (a) with $CO_2$ before, during or after step (b).

According to another embodiment of the present invention, the surface-reacted calcium carbonate is obtained by a process comprising the following steps:

(a) providing ground natural calcium carbonate (GNCC) or precipitated calcium carbonate (PCC);

(b) providing at least one water-soluble acid;

(c) providing gaseous $CO_2$; and (d) contacting said GNCC or PCC provided in step (a), the at least one acid provided in step (b) and the gaseous $CO_2$ provided in step (c);

characterized in that (i) the at least one acid provided in step (b) has a $pK_a$ of greater than 2.5 and less than or equal to 7 at 20° C., associated with the ionisation of its first available hydrogen, and a corresponding anion is formed on loss of this first available hydrogen capable of forming a water-soluble calcium salt; and (ii) following contacting the at least one water-soluble acid provided in step (b) and the GNCC or PCC provided in step (a), at least one water-soluble salt, which in the case of a hydrogen-containing salt has a $pK_a$ of greater than 7 at 20° C., associated with the ionisation of the first available hydrogen, and the salt anion of which is capable of forming water-insoluble calcium salts, is additionally provided.

According to still another embodiment of the present invention, (i) the natural calcium carbonate is selected from the group consisting of marble, chalk, dolomite, limestone and mixtures thereof; and/or (ii) the precipitated calcium carbonate comprises aragonitic, vateritic or calcitic mineralogical crystal forms or mixtures thereof.

According to another embodiment of the present invention, the extrusion aid has (i) a volume median grain diameter $d_{50}$ (vol) of from 1 to 75 µm, preferably from 1.5 to 50 µm, more preferably from 2 to 40 µm, and most preferably from 2.5 to 7.0 µm; and/or (ii) a volume grain diameter $d_{98}$ (vol) of from 2 to 150 µm, preferably from 4 to 100 µm, more preferably from 6 to 80 µm, even more preferably from 8 to 60 µm, and most preferably from 10 to 30 µm.

According to another embodiment of the present invention, the extrusion aid has a specific surface area of from 15 to 200 $m^2/g$, preferably from 27 to 180 $m^2/g$, more preferably from 30 to 160 $m^2/g$, even more preferably from 45 to 150 $m^2/g$, and most preferably from 48 to 140 $m^2/g$, measured using nitrogen and the BET method according to ISO 9277:1995.

According to another embodiment of the present invention, the mixture obtained in step (c) comprises from 0.01 to 10 wt.-%, preferably from 0.05 to 5 wt.-%, more preferably from 0.1 to 2 wt.-%, and most preferably from 0.2 to 1.8 wt.-% of the extrusion aid provided in step (b), based on the total dry weight of said mixture.

According to another embodiment of the present invention, (i) the mixture obtained in step (c) is heated to from 100° C. to 150° C., preferably from 105° C. to 140° C., more preferably from 110° C. to 135° C., and most preferably from 115° C. to 130° C.; and/or (ii) the extruder operates at a minimum pressure of 0.5 MPa, preferably 2.5 MPa, more preferably 3.5 MPa, even more preferably 5 MPa, even more preferably 5.5 MPa, and most preferably 6 MPa; and/or (iii) the extruder operates at a maximum pressure of 10 MPa, preferably 8 MPa, more preferably 7.5 MPa, even more preferably 6 MPa, and most preferably 5 MPa.

According to still another embodiment of the present invention, the mixture obtained in step (c) further comprises the following additives: (i) water, preferably in amount of from 0.01 to 15 wt.-%, more preferably from 0.1 to 10 wt.-%, and most preferably from 0.2 to 5 wt.-%; and/or (ii) whole grains, preferably in amount of from 0.1 to 30 wt.-%, more preferably from 0.5 to 20 wt.-%, and most preferably from 1 to 15 wt.-%; and/or (iii) sucrose, preferably in amount of from 0.01 to 20 wt.-%, more preferably from 0.1 to 10 wt.-%, and most preferably from 0.2 to 5 wt.-%; and/or (iv) sodium chloride, preferably in amount of from 0.001 to 5 wt.-%, more preferably from 0.01 to 2 wt.-%, and most preferably from 0.1 to 1 wt.-%; each based on the total dry weight of said mixture.

According to still another embodiment of the present invention, the process further comprises step (e) of processing the puffed polysaccharide-based extrudate obtained in step (d) into: (i) a food product for human consumption, preferably breakfast cereals and/or snacks; or (ii) a food product for animal consumption, preferably pet food, and more preferably fish food, bird food, dog food and/or cat food; or (iii) a packaging material.

According to still another embodiment of the present invention, the puffed polysaccharide-based material obtainable according to the inventive process provides: (i) an expansion index F of from 5 to 30, preferably from 8 to 25, more preferably from 10 to 20, and most preferably from 12 to 18; and/or (ii) a crispness of from 25 to 50 N, preferably from 30 to 48 N, more preferably from 32 to 45 N, and most preferably from 35 to 40 N, measured on a TA.HDplus Texture Analyser from Stable Micro Systems equipped with a Kramer Shear cell with 10 blades.

In the following, embodiments of the inventive extrusion process using surface-reacted calcium carbonate will be described in detail. It is to be understood that these details and embodiments also apply to the use of the surface-reacted calcium carbonate for the purpose of the present invention. Where appropriate, these details further apply to the product obtainable according to the inventive process.

(a) The Polysaccharide-Containing Ground Material

The base material used in the extrusion process according to the present invention is a polysaccharide-containing ground material, excluding fibrillated cellulose-containing materials (i.e. materials containing microfibrillated cellulose, materials containing nanofibrillated cellulose, materials containing nano-crystalline cellulose and/or fractionated cellulosic materials referenced as noil or crill), and is provided in step (a).

A "polysaccharide" in the meaning of the present invention is understood to be a polymeric carbohydrate composed of long chains of monosaccharide units, preferably 10 or more units, bound together by glycosidic linkages, excluding fibrillated cellulose. Typical examples of polysaccharides include glycogen, starch, pectines, chitin, callose, or cellulose excluding fibrillated cellulose.

Accordingly, the term "polysaccharide" shall not include fibrillated cellulose in any of the aspects and embodiments disclosed in the present application. The expression "fibrillated cellulose" as used herein is a collective referring to both micro- and nanofibrillated cellulose, nano-crystalline cellulose and/or fractionated cellulosic materials referenced as noil or crill.

When fibres are refined under high energy, they become fibrillated as the cell walls are broken and torn into attached strips, i.e. into fibrils. If this process is continued to separate the fibrils from the body of the fibre, it releases said fibrils. The breakdown of fibres into isolated microfibrils is referred to as "microfibrillation". This process may be continued until there are no fibres left and only elementary or primary fibrils remain which have a nanosized diameter. The foregoing breakdown of fibres into isolated elementary or primary fibrils is referred to as "nanofibrillation".

The corresponding celluloses are referred to as microfibrillated cellulose and nanofibrillated cellulose, respectively. Accordingly, the term "microfibrillated cellulose" in the context of the present invention relates to a plurality of fibres, which is at least partially broken down to microfibrils, preferably microfibrillated cellulose is essentially free or free of isolated primary or elementary fibrils. In a similar manner, the term "nanofibrillated cellulose" relates to a plurality of fibres, which is at least partially broken down to primary or elementary fibrils, preferably nanofibrillated cellulose is essentially free or free of isolated microfibrils. In the meaning of the present application, a material is "essentially" free of a specific substance if the amount of that substance may vary within a certain tolerable range without deviating from the basic concept underlying the present invention. Preferably, a material is "essentially" free of a specific substance if it contains less than 10 wt.-% of that substance, more preferably less than 5 wt.-% and most preferably less than 1 wt.-%, based on the total dry weight of said material.

In one embodiment, the polysaccharide is a homopolysaccharide meaning that the polysaccharide is composed of a plurality of identical monosaccharide units. In such case, the product obtained according to the present invention is a puffed homopolysaccharide-based material. Preferably, the monosaccharide is selected from glucose and/or fructose. Examples of suitable glucose or fructose homopolysaccharides thus include starch, glycogen, callose, cellulose excluding fibrillated cellulose, and inulin.

A particularly preferred (homo-)polysaccharide is starch. Starch is a homopolymer of glucose and is used as a storage polysaccharide in plants, being found in the form of both amylose and the branched amylopectin. In the meaning of the present application, the term "starch" refers to a mixture of amylose and amylopectin unless indicated otherwise.

Suitable polysaccharide-containing materials are cereals. In one embodiment, the polysaccharide-containing ground material therefore is a ground cereal. In a preferred embodiment, said cereal is selected from barley, corn (maize), oats, rice, rye, spelt, wheat, amaranth, quinoa, millet or mixtures thereof. If cereals are used as the polysaccharide-containing material, it is in principle possible to use both ground whole grains and ground refined grains to provide the polysaccharide-containing ground material of step (a). In one embodiment, the polysaccharide-containing ground material is therefore selected from ground whole grain cereals or ground refined grain cereals. In a preferred embodiment, the polysaccharide-containing ground material is a ground refined grain cereal.

The product obtainable according to the inventive process is a puffed material, meaning that it has an expanded porous or foamy structure which is caused by evaporation of a liquid (e.g. water) embedded in the polysaccharide-containing starting material by applying elevated temperatures and/or rapid pressure decrease. For the purpose of the present invention, at least part of the starting material provided in step (a) is a ground material in order to ensure that the extrusion aid is in contact with the polysaccharide.

The ground material provided in step (a) may in principle have any grinding degree, i.e. it may be finely ground or coarsely ground. According to one embodiment, the polysaccharide-containing ground material is provided in the form of groat, semolina or flour. According to another embodiment, the polysaccharide-containing ground material is provided in the form of flour. Therefore, a preferred embodiment of the inventive process uses cereal flour as the polysaccharide-containing ground material.

Additionally, also non-cereal flours from other polysaccharide sources may be used such as, for example, potato flour, tapioca flour, nut-flour or mixtures thereof. Examples of nut flour are almond, coconut, hazelnut, pecan, and macadamia flour or mixtures thereof.

According to another preferred embodiment, the polysaccharide-containing ground material is selected from groat, semolina or flour of the following suitable cereals: barley, corn (maize), oats, rice, rye, spelt, wheat, amaranth, quinoa, millet or mixtures thereof. More preferably, the polysaccharide-containing ground material is corn (maize) flour, wheat flour, nut flour or a mixture thereof.

In some embodiments of the present invention, it may be sufficient if at least part of the starting material in step (a) is provided as a ground material. Therefore, it is also possible to use a mixture of ground materials, for example any of the flours described hereinabove, and whole grains.

The polysaccharide-containing ground material provided in step (a) may contain water or other evaporable liquids. In case of using ground cereals or other starch-containing ground materials, the polysaccharide-containing ground material naturally contains water. In some embodiments, the polysaccharide-containing ground material provided in step (a) contains water in an amount of from 0.05 to 50 wt.-%, preferably from 0.1 to 40 wt.-%, more preferably from 0.5 to 30 wt.-%, and most preferably from 1 to 25 wt.-%, based on the total weight of the polysaccharide-containing ground material.

(b) The Extrusion Aid

The extrusion aid defined in step (b) of the inventive process is a surface-reacted calcium carbonate (SRCC). Surface-reacted calcium carbonate is also referred to as functionalized calcium carbonate (FCC).

The surface-reacted calcium carbonate is a reaction product of ground natural calcium carbonate or precipitated calcium carbonate treated with $CO_2$ and one or more $H_3O^+$ ion donors, wherein the $CO_2$ is formed in situ by the $H_3O^+$ ion donors treatment and/or is supplied from an external source.

An $H_3O^+$ ion donor in the context of the present invention is a Brønsted acid and/or an acid salt.

In a preferred embodiment of the invention, the surface-reacted calcium carbonate is obtained by a process comprising the steps of:
(a) providing a suspension of ground natural calcium carbonate (GNCC) or precipitated calcium carbonate (PCC);
(b) adding at least one acid having a $pK_a$ value of 0 or less at 20° C., or having a $pK_a$ value from 0 to 2.5 at 20° C. to the suspension provided in step (a); and
(c) treating the suspension provided in step (a) with $CO_2$ before, during or after step (b).

According to another embodiment, the surface-reacted calcium carbonate is obtained by a process comprising the steps of:
(a) providing a ground natural calcium carbonate (GNCC) or precipitated calcium carbonate (PCC);
(b) providing at least one water-soluble acid;
(c) providing gaseous $CO_2$; and
(d) contacting said GNCC or PCC provided in step (a), the at least one acid provided in step (b) and the gaseous $CO_2$ provided in step (c);
characterized in that (i) the at least one acid provided in step (b) has a $pK_a$ of greater than 2.5 and less than or equal to 7 at 20° C., associated with the ionisation of its first available hydrogen, and a corresponding anion is formed on loss of this first available hydrogen capable of forming a water-soluble calcium salt; and (ii) following contacting the at least one water-soluble acid provided in step (b) and the GNCC or PCC provided in step (a), at least one water-soluble salt, which in the case of a hydrogen-containing salt has a $pK_a$ of greater than 7 at 20° C., associated with the ionisation of the first available hydrogen, and the salt anion of which is capable of forming water-insoluble calcium salts, is additionally provided.

The source of calcium carbonate, e.g. "ground natural calcium carbonate" (GNCC), preferably is selected from calcium carbonate-containing minerals selected from the group comprising marble, chalk, limestone and mixtures thereof. Natural calcium carbonate may comprise further naturally occurring components such as magnesium carbonate, alumino silicate etc.

In general, the grinding of ground natural calcium carbonate may be performed in a dry or wet grinding process and may be carried out with any conventional grinding device, for example, under conditions such that comminution predominantly results from impacts with a secondary body, i.e. in one or more of: a ball mill, a rod mill, a vibrating mill, a roll crusher, a centrifugal impact mill, a vertical bead mill, an attrition mill, a pin mill, a hammer mill, a pulveriser, a shredder, a de-clumper, a knife cutter, or other such equipment known to the skilled person. In case the ground natural calcium carbonate comprises wet ground calcium carbonate, the grinding step may be performed under conditions such that autogenous grinding takes place and/or by horizontal ball milling, and/or other such processes known to the skilled person. The wet processed ground natural calcium carbonate thus obtained may be washed and dewatered by well-known processes, e.g. by flocculation, filtration or forced evaporation prior to drying. The subsequent step of drying (if necessary) may be carried out in a single step such as spray drying, or in at least two steps. It is also common that such a mineral material undergoes a beneficiation step (such as a flotation, bleaching or magnetic separation step) to remove impurities.

A "precipitated calcium carbonate" (PCC) in the meaning of the present invention is a synthesized material, generally obtained by precipitation following a reaction of $CO_2$ and calcium hydroxide in an aqueous environment or by precipitation of calcium and carbonate ions, for example $CaCl_2$ and $Na_2CO_3$, out of solution. Further possible ways of producing PCC are the lime soda process, or the Solvay process in which PCC is a by-product of ammonia production. Precipitated calcium carbonate exists in three primary crystalline forms: calcite, aragonite and vaterite, and there are many different polymorphs (crystal habits) for each of these crystalline forms. Calcite has a trigonal structure with typical crystal habits such as scalenohedral (S-PCC), rhombohedral (R-PCC), hexagonal prismatic, pinacoidal, colloidal (C-PCC), cubic, and prismatic (P-PCC). Aragonite is an orthorhombic structure with typical crystal habits of twinned hexagonal prismatic crystals, as well as a diverse assortment of thin elongated prismatic, curved bladed, steep pyramidal, chisel shaped crystals, branching tree, and coral or wormlike form. Vaterite belongs to the hexagonal crystal system. The obtained PCC slurry can be mechanically dewatered and dried.

According to one embodiment of the present invention, the precipitated calcium carbonate is precipitated calcium carbonate, preferably comprising aragonitic, vateritic or calcitic mineralogical crystal forms or mixtures thereof.

Precipitated calcium carbonate may be ground prior to the treatment with $CO_2$ and at least one $H_3O^+$ ion donor by the same means as used for grinding natural calcium carbonate and described above.

According to one embodiment of the present invention, the natural or precipitated calcium carbonate is in form of particles having a weight median particle size $d_{50}$ (wt) of from 0.05 to 10.0 μm, preferably from 0.2 to 5.0 μm, more preferably from 0.4 to 3.0 μm, most preferably from 0.6 to 1.2 μm, and especially 0.7 μm. According to a further embodiment of the present invention, the natural or precipitated calcium carbonate is in form of particles having a top cut particle size $d_{98}$ (wt) of from 0.15 to 55 μm, preferably from 1 to 40 μm, more preferably from 2 to 25 μm, most preferably from 3 to 15 μm, and especially 4 μm.

The value $d_x$ represents the diameter relative to which x % of the particles have diameters less than $d_x$. This means that the $d_{98}$ value is the particle size at which 98% of all particles are smaller. The $d_{98}$ value is also designated as "top cut". The $d_x$ values may be given in volume or weight percent. The $d_{50}$ (wt) value is thus the "weight median particle size", i.e. 50 wt.-% of all grains are smaller than this particle size, and the $d_{50}$ (vol) value is the "volume median particle size", i.e. 50 vol.-% of all grains are smaller than this particle size.

The natural and/or precipitated calcium carbonate may be used dry or suspended in water. Preferably, a corresponding slurry has a content of natural or precipitated calcium carbonate within the range of from 1 to 90 wt.-%, more preferably from 3 to 60 wt.-%, even more preferably from 5 to 40 wt.-%, and most preferably from 10 to 25 wt.-%, based on the total weight of the slurry.

The one or more $H_3O^+$ ion donor used for the preparation of surface reacted calcium carbonate may be any strong acid, medium-strong acid, or weak acid, or mixtures thereof, generating $H_3O^+$ ions under the preparation conditions. According to the present invention, the at least one $H_3O^+$ ion donor can also be an acid salt, generating $H_3O^+$ ions under the preparation conditions.

According to one embodiment, the at least one $H_3O^+$ ion donor is a strong acid having a $pK_a$ of 0 or less at 20° C.

According to another embodiment, the at least one $H_3O^+$ ion donor is a medium-strong acid having a $pK_a$ value from 0 to 2.5 at 20° C. If the $pK_a$ at 20° C. is 0 or less, the acid is preferably selected from sulphuric acid, hydrochloric acid, or mixtures thereof. If the $pK_a$ at 20° C. is from 0 to 2.5, the $H_3O^+$ ion donor is preferably selected from $H_2SO_3$, $H_3PO_4$, oxalic acid, or mixtures thereof. The at least one $H_3O^+$ ion donor can also be an acid salt, for example, $HSO_4^-$ or $H_2PO_4$, being at least partially neutralized by a corresponding cation such as $Li^+$, $Na^+$ or $K^+$, or $HPO_4^{2-}$, being at least partially neutralised by a corresponding cation such as $Li^+$, $Na^+$, $K^+$, $Mg^{2+}$ or $Ca^{2+}$. The at least one $H_3O^+$ ion donor can also be a mixture of one or more acids and one or more acid salts.

According to still another embodiment, the at least one $H_3O^+$ ion donor is a weak acid having a $pK_a$ value of greater than 2.5 and less than or equal to 7, when measured at 20° C., associated with the ionisation of the first available hydrogen, and having a corresponding anion, which is capable of forming water-soluble calcium salts. Subsequently, at least one water-soluble salt, which in the case of a hydrogen-containing salt has a $pK_a$ of greater than 7, when measured at 20° C., associated with the ionisation of the first available hydrogen, and the salt anion of which is capable of forming water-insoluble calcium salts, is additionally provided. According to a more preferred embodiment, the weak acid has a $pK_a$ value from greater than 2.5 to 5 at 20° C., and more preferably the weak acid is selected from the group consisting of acetic acid, formic acid, propanoic acid, and mixtures thereof. Exemplary cations of said water-soluble salt are selected from the group consisting of potassium, sodium, lithium and mixtures thereof. In a more preferred embodiment, said cation is sodium or potassium. Exemplary anions of said water-soluble salt are selected from the group consisting of phosphate, dihydrogen phosphate, monohydrogen phosphate, oxalate, silicate, mixtures thereof and hydrates thereof. In a more preferred embodiment, said anion is selected from the group consisting of phosphate, dihydrogen phosphate, monohydrogen phosphate, mixtures thereof and hydrates thereof. In a most preferred embodiment, said anion is selected from the group consisting of dihydrogen phosphate, monohydrogen phosphate, mixtures thereof and hydrates thereof. Water-soluble salt addition may be performed dropwise or in one step. In the case of drop wise addition, this addition preferably takes place within a time period of 10 minutes. It is more preferred to add said salt in one step.

According to one embodiment of the present invention, the at least one $H_3O^+$ ion donor is selected from the group consisting of hydrochloric acid, sulphuric acid, sulphurous acid, phosphoric acid, citric acid, oxalic acid, acetic acid, formic acid, and mixtures thereof. Preferably the at least one $H_3O^+$ ion donor is selected from the group consisting of hydrochloric acid, sulphuric acid, *sulphurous* acid, phosphoric acid, oxalic acid, $H_2PO_4^-$, being at least partially neutralised by a corresponding cation such as $Li^+$, $Na^+$ or $K^+$, $HPO_4^{2-}$, being at least partially neutralised by a corresponding cation such as $Li^+$, $Na^+$, $K^+$, $Mg^{2+}$, or $Ca^{2+}$ and mixtures thereof, more preferably the at least one acid is selected from the group consisting of hydrochloric acid, sulphuric acid, sulphurous acid, phosphoric acid, oxalic acid, or mixtures thereof, and most preferably, the at least one $H_3O^+$ ion donor is phosphoric acid.

The one or more $H_3O^+$ ion donor can be added to the suspension as a concentrated solution or a more diluted solution. Preferably, the molar ratio of the $H_3O^+$ ion donor to the natural or precipitated calcium carbonate is from 0.01 to 4, more preferably from 0.02 to 2, even more preferably from 0.05 to 1 and most preferably from 0.1 to 0.58.

As an alternative, it is also possible to add the $H_3O^+$ ion donor to the water before the natural or precipitated calcium carbonate is suspended.

In a next step, the natural or precipitated calcium carbonate is treated with $CO_2$. If a strong acid such as sulphuric acid or hydrochloric acid is used for the $H_3O^+$ ion donor treatment of the natural or precipitated calcium carbonate, the $CO_2$ is automatically formed. Alternatively or additionally, the $CO_2$ can be supplied from an external source.

$H_3O^+$ ion donor treatment and treatment with $CO_2$ can be carried out simultaneously which is the case when a strong or medium-strong acid is used. It is also possible to carry out $H_3O^+$ ion donor treatment first, e.g. with a medium strong acid having a $pK_a$ in the range of 0 to 2.5 at 20° C., wherein $CO_2$ is formed in situ, and thus, the $CO_2$ treatment will automatically be carried out simultaneously with the $H_3O^+$ ion donor treatment, followed by the additional treatment with $CO_2$ supplied from an external source.

Preferably, the concentration of gaseous $CO_2$ in the suspension is, in terms of volume, such that the ratio (volume of suspension):(volume of gaseous $CO_2$) is from 1:0.05 to 1:20, even more preferably 1:0.05 to 1:5.

In a preferred embodiment, the $H_3O^+$ ion donor treatment step and/or the $CO_2$ treatment step are repeated at least once, more preferably several times. According to one embodiment, the at least one $H_3O^+$ ion donor is added over a time period of at least about 5 min, preferably at least about 10 min, typically from about 10 to about 20 min, more preferably about 30 min, even more preferably about 45 min, and sometimes about 1 h or more.

Subsequent to the $H_3O^+$ ion donor treatment and $CO_2$ treatment, the pH of the aqueous suspension, measured at 20° C., naturally reaches a value of greater than 6.0, preferably greater than 6.5, more preferably greater than 7.0, even more preferably greater than 7.5, thereby preparing the surface-reacted natural or precipitated calcium carbonate as an aqueous suspension having a pH of greater than 6.0, preferably greater than 6.5, more preferably greater than 7.0, even more preferably greater than 7.5.

Further details about the preparation of the surface-reacted natural calcium carbonate are disclosed in WO 00/39222 A1, WO 2004/083316 A1, WO 2005/121257 A2, WO 2009/074492 A1, EP 2 264 108 A1, EP 2 264 109 A1 and US 2004/0020410 A1, the content of these references herewith being included in the present application.

Similarly, surface-reacted precipitated calcium carbonate may be obtained. As can be taken in detail from WO 2009/074492 A1, surface-reacted precipitated calcium carbonate is obtained by contacting precipitated calcium carbonate with $H_3O^+$ ions and with anions being solubilized in an aqueous medium and being capable of forming water-insoluble calcium salts, in an aqueous medium to form a slurry of surface-reacted precipitated calcium carbonate, wherein said surface-reacted precipitated calcium carbonate comprises an insoluble, at least partially crystalline calcium salt of said anion formed on the surface of at least part of the precipitated calcium carbonate.

Said solubilized calcium ions correspond to an excess of solubilized calcium ions relative to the solubilized calcium ions naturally generated on dissolution of precipitated calcium carbonate by $H_3O^+$ ions, where said $H_3O^+$ ions are provided solely in the form of a counter ion to the anion, i.e. via the addition of the anion in the form of an acid or non-calcium acid salt, and in absence of any further calcium ion or calcium ion generating source.

Said excess solubilized calcium ions are preferably provided by the addition of a soluble neutral or acid calcium salt, or by the addition of an acid or a neutral or acid non-calcium salt which generates a soluble neutral or acid calcium salt in situ.

Said $H_3O^+$ ions may be provided by the addition of an acid or an acid salt of said anion, or the addition of an acid or an acid salt which simultaneously serves to provide all or part of said excess solubilized calcium ions.

In a further preferred embodiment of the preparation of the surface-reacted natural or precipitated calcium carbonate, the natural or precipitated calcium carbonate is reacted with the acid and/or the $CO_2$ in the presence of at least one compound selected from the group consisting of silicate, silica, aluminium hydroxide, earth alkali aluminate such as sodium or potassium aluminate, magnesium oxide, aluminium sulfate or mixtures thereof. Preferably, the at least one silicate is selected from an aluminium silicate, a calcium silicate, or an earth alkali metal silicate. These components can be added to an aqueous suspension comprising the natural or precipitated calcium carbonate before adding the acid and/or $CO_2$.

Alternatively, the silicate and/or silica and/or aluminium hydroxide and/or earth alkali aluminate and/or magnesium oxide component(s) can be added to the aqueous suspension of natural or precipitated calcium carbonate while the reaction of natural or precipitated calcium carbonate with an acid and $CO_2$ has already started. Further details about the preparation of the surface-reacted natural or precipitated calcium carbonate in the presence of at least one silicate and/or silica and/or aluminium hydroxide and/or earth alkali aluminate component(s) are disclosed in WO 2004/083316 A1, the content of this reference herewith being included in the present application.

The surface-reacted calcium carbonate can be kept in suspension, optionally further stabilised by a dispersant. Conventional dispersants known to the skilled person can be used. A preferred dispersant is comprised of polyacrylic acids and/or carboxymethylcelluloses.

Alternatively, the aqueous suspension described above can be dried, thereby obtaining the solid (i.e. dry or containing as little water that it is not in a fluid form) surface-reacted natural or precipitated calcium carbonate in the form of granules or a powder.

The surface reacted calcium carbonate may have different particle shapes, such as, for example, the shape of roses, golf balls and/or brains.

In a preferred embodiment, the extrusion aid has a specific surface area of from 15 to 200 m$^2$/g, preferably from 27 to 180 m$^2$/g, more preferably from 30 to 160 m$^2$/g, even more preferably from 45 to 150 m$^2$/g, and most preferably from 48 to 140 m$^2$/g, measured using nitrogen and the BET method according to ISO 9277:1995. In a further embodiment, the extrusion aid has a specific surface area of 120 m$^2$/g or less, more preferably from 60 to 120 m$^2$/g, and most preferably from 70 to 105 m$^2$/g, measured using nitrogen and the BET method according to ISO 9277:1995. For example, the extrusion aid may have a specific surface area of from 75 to 100 m$^2$/g, measured using nitrogen and the BET method according to ISO 9277:1995.

It is furthermore preferred that the extrusion aid has a volume median grain diameter $d_{50}$ (vol) of from 1 to 75 µm, preferably from 2 to 50 µm, more preferably from 3 to 40 µm, even more preferably from 4 to 30 µm, and most preferably from 5 to 15 µm. According to another preferred embodiment, the extrusion aid has a volume median grain diameter $d_{50}$ (vol) of from 1.5 to 12 µm, preferably from 2 to 5 µm or from 6 to 10 µm.

It may furthermore be preferred that the extrusion aid has a grain diameter $d_{98}$ (vol) of from 2 to 150 µm, preferably from 4 to 100 µm, more preferably from 6 to 80 µm, even more preferably from 8 to 60 µm, and most preferably from 10 to 30 µm. According to another preferred embodiment, the extrusion aid has a volume grain diameter $d_{98}$ (vol) of from 5 to 20 µm, preferably from 8 to 12 µm or from 13 to 18 µm.

According to a particularly preferred embodiment, the extrusion aid is thus a surface-reacted ground natural calcium carbonate (GNCC) having: (i) a volume median grain diameter $d_{50}$ (vol) of from 1.5 to 12 µm, preferably from 2 to 5 µm or from 6 to 10 µm; and/or (ii) a volume grain diameter $d_{98}$ (vol) of from 5 to 20 µm, preferably from 8 to 12 µm or from 13 to 18 µm. According to another particularly preferred embodiment, the extrusion aid is a surface-reacted ground natural calcium carbonate (GNCC) having: (i) a volume median grain diameter $d_{50}$ (vol) of from 1.5 to 12 µm, preferably from 2 to 5 µm or from 6 to 10 µm; and/or (ii) a volume grain diameter $d_{98}$ (vol) of from 5 to 20 µm, preferably from 8 to 12 µm or from 13 to 18 µm; and/or (iii) a specific surface area of 120 m$^2$/g or less, more preferably from 60 to 120 m$^2$/g, and most preferably from 70 to 105 m$^2$/g, measured using nitrogen and the BET method according to ISO 9277:1995. In the foregoing embodiments, it may further be preferred that the polysaccharide-containing ground material is selected from groat, semolina or flour of the following suitable cereals: barley, corn (maize), oats, rice, rye, spelt and wheat, preferably corn (maize) flour or wheat flour.

The processes and instruments used to determine the grain size of fillers and pigments are commonly known to the skilled person and are described in more detail in the experimental section.

According to another preferred embodiment, the extrusion aid has an intra-particle intruded specific pore volume in the range from 0.1 to 2.3 cm$^3$/g, more preferably from 0.2 to 2.0 cm$^3$/g, especially preferably from 0.4 to 1.8 cm$^3$/g and most preferably from 0.6 to 1.6 cm$^3$/g, calculated from mercury porosimetry measurement.

The intra-particle pore size of the extrusion aid preferably is in a range of from 0.004 to 1.6 µm, more preferably in a range of between 0.005 to 1.3 µm, especially preferably from 0.006 to 1.15 µm and most preferably of 0.007 to 1.0 µm, e.g. 0.004 to 0.50 µm determined by mercury porosimetry measurement.

The specific pore volume can be measured using a mercury intrusion porosimetry measurement using a Micromeritics Autopore V 9620 mercury porosimeter.

The total pore volume seen in the cumulative intrusion data can be separated into two regions with the intrusion data from 214 µm down to about 1 to 4 µm showing the coarse packing of the sample between any agglomerate structures contributing strongly. Below these diameters lies the fine interparticle packing of the particles themselves. If they also have intraparticle pores, then this region appears bimodal, and by taking the specific pore volume intruded by mercury into pores finer than the modal turning point, i.e. finer than the bimodal point of inflection, we thus define the specific intraparticle pore volume. The sum of these three regions gives the total overall pore volume of the powder, but depends strongly on the original sample compaction/settling of the powder at the coarse pore end of the distribution.

By taking the first derivative of the cumulative intrusion curve the pore size distributions based on equivalent Laplace diameter, inevitably including pore-shielding, are revealed. The differential curves clearly show the coarse agglomerate pore structure region, the interparticle pore region and the intraparticle pore region, if present. Knowing the intraparticle pore diameter range it is possible to subtract the remainder interparticle and interagglomerate pore volume from the total pore volume to deliver the desired pore volume of the internal pores alone in terms of the pore volume per unit mass (specific pore volume). The same principle of subtraction, of course, applies for isolating any of the other pore size regions of interest.

(c) Mixing

In step (c) of the process according to the present invention, the polysaccharide-containing ground material provided in step (a) and the extrusion aid provided in step (b) are combined to obtain an extrudable mixture. As noted above, according to the present invention the polysaccharide-containing ground material provided in step (a) excludes fibrillated cellulose-containing materials.

In principle, there exist two ways for preparing the mixture of step (c), namely separate feeding to the extruder and pre-mixing.

According to a first embodiment, the polysaccharide-containing ground material provided in step (a) and the extrusion aid provided in step (b) are fed separately to the extruder inlet, meaning that the raw mixture of step (c) comprising the polysaccharide-containing ground material and the extrusion aid is formed within the extruder.

According to a preferred embodiment, the polysaccharide-containing ground material provided in step (a) and the extrusion aid provided in step (b) are pre-mixed to obtain the mixture of step (c) which is then fed to the extruder inlet. For this purpose, any suitable mixing device known in the art may be used, for example a spiral kneader or a ploughshare mixer.

According to still another embodiment, a combination of separate feeding and pre-mixing may be used to obtain the mixture of step (c) comprising the polysaccharide-containing ground material and the extrusion aid.

In a typical process according to the present invention, the major component of the mixture obtained in step (c), on a dry weights basis, is the polysaccharide-containing ground material. In one embodiment, the mixture obtained in step (c) comprises at least 70 wt.-%, preferably at least 80 wt.-%, and most preferably at least 85 wt.-% of polysaccharide-containing ground material, based on the total dry weight of said mixture. According to another embodiment, the mixture obtained in step (c) comprises from 60 to 99.5 wt.-%, more preferably from 70 to 98.5 wt.-%, and most preferably from 75 to 98 wt.-% of polysaccharide-containing ground material, based on the total dry weight of said mixture.

The second important component in the raw mixture of step (c) is the extrusion aid which is a surface-reacted calcium carbonate. According to one embodiment of the present invention, the mixture obtained in step (c) comprises from 0.01 to 10 wt.-%, preferably from 0.05 to 5 wt.-%, more preferably from 0.1 to 2 wt.-%, and most preferably from 0.2 to 1.8 wt.-% of said extrusion aid provided in step (b), based on the total dry weight of said mixture. According to another embodiment of the present invention, the mixture obtained in step (c) comprises from 0.3 to 0.7 wt.-% or from 1.2 to 2.2 wt.-% of said extrusion aid provided in step (b), based on the total dry weight of said mixture. Preferably, the extrusion aid of the foregoing embodiments is a surface-reacted ground natural calcium carbonate (GNCC) having: (i) a volume median grain diameter $d_{50}$ (vol) of from 1.5 to 12 µm, preferably from 2 to 5 µm or from 6 to 10 µm; and/or (ii) a volume grain diameter $d_{98}$ (vol) of from 5 to 20 µm, preferably from 8 to 12 µm or from 13 to 18 µm; and/or (iii) a specific surface area of 120 m$^2$/g or less, more preferably from 60 to 120 m$^2$/g, and most preferably from 70 to 105 m$^2$/g, measured using nitrogen and the BET method according to ISO 9277:1995.

In addition to the polysaccharide-containing ground material provided in step (a) and the extrusion aid provided in step (b), the mixture obtained in step (c) may contain one or more suitable additives such as, for example, fillers, dispersants, lubricants, leavenings, nucleating agents, colorants, vitamins, antioxidants, fats, micro nutrients, or flavorants. Some preferred additives will be discussed hereinafter.

In one embodiment, the mixture obtained in step (c) further comprises added water, preferably in amount of from 0.01 to 15 wt.-%, more preferably from 0.1 to 10 wt.-%, and most preferably from 0.2 to 5 wt.-%, based on the total dry weight of said mixture. It should be noted that the total amount of water in the mixture obtained in step (c) may be higher than the amount of added water as both the polysaccharide-containing ground material provided in step (a) and the extrusion aid provided in step (b) may already contain water. In a preferred embodiment, the total water content of the mixture obtained in step (c) is therefore adjusted to from 0.5 to 70 wt.-%, preferably from 1 to 50 wt.-%, more preferably from 2 to 40 wt.-%, and most preferably from 5 to 30 wt.-%, based on the total weight of said mixture.

According to another embodiment of the present invention, the mixture obtained in step (c) further comprises added whole grains, preferably in amount of from 0.1 to 30 wt.-%, more preferably from 0.5 to 20 wt.-%, and most preferably from 1 to 15 wt.-%, based on the total dry weight of said mixture.

According to still another embodiment of the present invention, the mixture obtained in step (c) further comprises added sucrose, preferably in amount of from 0.01 to 20 wt.-%, more preferably from 0.1 to 10 wt.-%, and most preferably from 0.2 to 5 wt.-%, based on the total dry weight of said mixture.

According to still another embodiment of the present invention, the mixture obtained in step (c) further comprises sodium chloride, preferably in amount of from 0.001 to 5 wt.-%, more preferably from 0.01 to 2 wt.-%, and most preferably from 0.1 to 1 wt.-%, based on the total dry weight of said mixture.

The mixture obtained in step (c) may also contain unmodified GNCC or PCC additives, i.e. calcium carbonates which are not surface-reacted. Moreover, added unmodified GNCC or PCC may serve as stiffening agent and may have a positive impact on the extrudate if used as packaging material. According to another preferred embodiment, the mixture obtained in step (c) thus comprises from 0.01 to 10 wt.-%, preferably from 0.05 to 5 wt.-%, more preferably from 0.1 to 2 wt.-%, and most preferably from 0.2 to 1.8 wt.-% of unmodified GNCC or PCC, based on the total dry weight of said mixture. Preferably, said unmodified GNCC or PCC is a food-grade GNCC or PCC.

According to a preferred embodiment of the present invention, said unmodified ground natural or precipitated calcium carbonate is in form of particles having a weight median particle size $d_{50}$ (wt) of from 0.05 to 10.0 µm, preferably from 0.2 to 5.0 µm, more preferably from 0.4 to 3.0 µm, most preferably from 0.6 to 1.2 µm, and especially 0.7 µm. According to a further embodiment of the present invention, the unmodified ground natural or precipitated calcium carbonate is in form of particles having a top cut particle size $d_{98}$ (wt) of from 0.15 to 55 µm, preferably from 1 to 40 µm, more preferably from 2 to 25 µm, most preferably from 3 to 15 µm, and especially 4 µm.

Moreover, the mixture obtained in step (c) may contain added modified starch and/or cellulose, excluding fibrillated cellulose, which may serve, for example, as stabilizer, dispersant, thickener or texture modifier. In one embodiment according to the present invention, the mixture obtained in step (c) therefore contains added modified starch, preferably in an amount of from 0.01 to 20 wt.-%, more preferably from 0.1 to 10 wt.-%, and most preferably from 0.2 to 5 wt.-%, based on the total dry weight of said mixture.

In principle, there exist also two ways for combining the foregoing additives with the mixture of step (c), namely separate feeding to the extruder and pre-mixing.

According to a first embodiment, the additives are fed separately to the extruder inlet, meaning that the raw mixture of step (c) comprising the polysaccharide-containing ground material, the extrusion aid and further additives is formed within the extruder. Side-feeding of additives may also be applied.

According to a preferred embodiment, the polysaccharide-containing ground material provided in step (a), the extrusion aid provided in step (b) and the further additives are pre-mixed to obtain the mixture of step (c) which is then fed to the extruder inlet. Suitable mixing methods are the same as described hereinabove.

According to still another embodiment, a combination of separate feeding and pre-mixing may be used to obtain the mixture of step (c) comprising the polysaccharide-containing ground material, the extrusion aid and further additives.

(d) Puffing

In step (d) of the process according to the present invention, the mixture obtained in step (c) is puffed by means of an extruder to obtain a puffed polysaccharide-based extrudate.

As already defined hereinabove, a puffed material in the meaning of the present invention provides the skeletal construct of a porous or foamy structure obtained through porous expansion of a suitable starting formulation. Preferably, expansion is achieved by evaporation of a liquid (e.g. water) embedded in said starting formulation using elevated temperatures and/or rapid pressure decrease.

In the presently described inventive process, an extruder is used to convert the mixture obtained in step (c) into a puffed material. For this purpose, any known extruder type may be used. The extruder thus may be a single-screw or twin-screw extruder. In a preferred embodiment, the extruder is a twin-screw extruder, most preferably a co-rotating twin-screw extruder.

The extruder may have various configurations. According to one embodiment of the present invention, the extruder has a screw diameter ranging from 35 to 55 mm, preferably from 40 to 50 mm, for example 44 mm.

In a more preferred embodiment, the extruder is operated at a screw speed of 60 to 450 rpm with co-rotating twin screws having the following screw configuration. The symbols "/" and "\" are used to indicate the conveying direction and number of the screw elements:

| | Feeder | | Mixing | Conv. | Pressure | Temp. | Shear Zone | | | |
|---|---|---|---|---|---|---|---|---|---|---|
| Number/Dir. | /// | / | \\ | / | /// /// | // // | \ | / | \ | /// |
| Gradient [°] | 66 | 44 | poly | 66 | 44 | 33 | 44 | 44 | 44 | 33 |
| Length [mm] | 66 | 44 | 20 | 66 | 44 | 33 | 15 | 15 | 15 | 33 |
| Offset [°] | — | — | — | — | 0 | 0 | 90 | 90 | 90 | 90 |

In the foregoing embodiment, the feeder zone consists of 3 elements DNDL 66/R66 and 1 element DNDL 44/R44, the mixing zone consists of 2 elements of DNDL P45-4/L20, the conveying zone consists of 1 element of DNDL 66/R66, the pressure zone consists of 6 elements of DNDL 44/R44e, the temperature zone consists of 4 elements of DNDL 33/R33, and the shear zone consists of 6 elements: 1 element of DNDL 44/L14.7, 1 element of DNDL 44/R14.7, 1 element of DNDL 44/L14.7 and 3 elements of DNDL 33/L33.

The characteristics of the extrudate may also be influenced by process parameters, such as moisture, temperature or pressure.

Therefore, in one embodiment of the inventive process, step (d) is characterized in that the mixture obtained in step (c) is heated to a temperature of from 100° C. to 150° C., preferably from 105° C. to 140° C., more preferably from 110° C. to 135° C., and most preferably from 115° C. to 130° C.

According to another embodiment of the inventive process, step (d) is characterized in that the extruder operates at a minimum pressure of 0.5 MPa, preferably 2.5 MPa, more preferably 3.5 MPa, even more preferably 5 MPa, even more preferably 5.5 MPa, and most preferably 6 MPa. Additionally or alternatively, the extruder operates at a maximum pressure of 10 MPa, preferably 8 MPa, more preferably 7.5 MPa, even more preferably 6 MPa, and most preferably 5 MPa.

According to another embodiment, suitable die forms and die combinations used at the extruder outlet include (hole diameter in parentheses): 2×1-hole die (3.3 mm), 2×1-hole die (5.0 mm), 2×6-hole die (3.0 mm), 2×10-hole die (2.0 mm), 2×12-hole die (1.0 mm), 1×2-hole die (3.0 mm), 1×2-hole die (star shaped), 1×2-hole die (tube, 3.0 and 2.0 mm). Preferred die forms and combinations are selected from 2×1-hole die (3.3 mm) and 1×2-hole die (3.0 mm).

In combination with any of the foregoing process parameters and configurations, the cross sectional area of the dies may range from 2 to 100 $mm^2$, more preferably from 5 to 50 $mm^2$, and most preferably from 10 to 20 $mm^2$.

In principle, the puffed polysaccharide-based extrudate obtained in step (d) may thus have any conceivable shape (chips, flakes, spheres, cylinders etc.) depending on the extruder configuration (die form, cutting device, torque, blade speed etc.).

(e) The Puffed Polysaccharide-Based Material

The product obtainable according to the process of the present invention is a puffed polysaccharide-based material excluding fibrillated cellulose-containing materials (i.e. materials containing microfibrillated cellulose, materials containing nanofibrillated cellulose, materials containing nano-crystalline cellulose and/or fractionated cellulosic materials referenced as noil or crill), meaning that it is produced from a polysaccharide-containing material excluding those containing fibrillated cellulose.

As indicated hereinabove, the term puffed indicates that the corresponding starting material has been subjected to an expansion step, preferably achieved by evaporation of a liquid (e.g. water) embedded in said starting material using elevated temperatures and/or rapid pressure decrease. In the present case, extrusion cooking is applied.

Usually, the starting material undergoes no or only little chemical conversion during the expansion process so that, according to a preferred embodiment, the puffed polysaccharide-based material obtainable according to the present invention is a puffed polysaccharide-containing material. The product obtainable according to the inventive process thus contains at least one polysaccharide (excluding fibrillated cellulose), at least one extrusion aid and, optionally, one or more additives selected from fillers, dispersants, lubricants, leavenings, nucleating agents, colorants, flavorants, and the like.

According to another embodiment of the present invention, the product obtainable according to the inventive process further comprises whole grains, preferably in amount of from 0.1 to 30 wt.-%, more preferably from 0.5 to 20 wt.-%, and most preferably from 1 to 15 wt.-%, based on the total dry weight of said product.

According to still another embodiment of the present invention, the product obtainable according to the inventive process further comprises sucrose, preferably in amount of from 0.01 to 20 wt.-%, more preferably from 0.1 to 10 wt.-%, and most preferably from 0.2 to 5 wt.-%, based on the total dry weight of said product.

According to still another embodiment of the present invention, the product obtainable according to the inventive process further comprises sodium chloride, preferably in amount of from 0.001 to 5 wt.-%, more preferably from 0.01 to 2 wt.-%, and most preferably from 0.1 to 1 wt.-%, based on the total dry weight of said product.

The product obtainable according to the inventive process may also contain unmodified GNCC or PCC. According to another preferred embodiment, the mixture obtained in step (c) thus comprises from 0.01 to 10 wt.-%, preferably from 0.05 to 5 wt.-%, more preferably from 0.1 to 2 wt.-%, and most preferably from 0.2 to 1.8 wt.-% of unmodified GNCC or PCC, based on the total dry weight of said product. Preferably, said unmodified GNCC or PCC is a food-grade GNCC or PCC.

The puffed polysaccharide-based material according to the present invention provides improved characteristics compared with conventional extrusion cooked puffed materials, such as material prepared without extrusion aid or with unmodified GNCC or PCC.

For example, the inventive puffed extrusion cooked material provides an increased expansion index which is associated with a lower density. According to a preferred embodiment, the puffed polysaccharide-based material provides an expansion index F of from 5 to 30, preferably from 8 to 25, more preferably from 10 to 20, and most preferably from 12 to 18.

According to another embodiment, the puffed polysaccharide-based material provides a crispness of from 25 to 50 N, preferably from 30 to 48 N, more preferably from 32 to 45 N, and most preferably from 35 to 40 N, measured on a TA.HDplus Texture Analyser from Stable Micro Systems equipped with a Kramer Shear cell with 10 blades.

In view of the increased expansion index and improved crispness the mouthfeel of corresponding food products is also improved. According to a further embodiment, the inventive process therefore comprises step (e) of processing the puffed polysaccharide-based extrudate obtained in step (d) into:
 (i) a food product for human consumption, preferably breakfast cereals and/or snacks; or
 (ii) a food product for animal consumption, preferably pet food, and more preferably fish food, bird food, dog food and/or cat food.

Food products for animal consumption further may include food products for farm animals such as cattle, cow, horse, pork, and poultry food.

Typical processing steps of the foregoing embodiment include deep frying as well as the addition of colorants or flavorants.

However, as an increased expansion index is not only associated with an improved mouthfeel but also with a lower density, the puffed polysaccharide-based material may also be used as or processed into a packaging material for example in the form of chips, flakes, spheres, cylinders etc. According to another embodiment, the inventive process therefore comprises step (e) of processing the puffed polysaccharide-based extrudate obtained in step (d) into a packaging material. The packaging materials according to the present invention may be biodegradable.

It is worth noting that the extrusion aid contained in the puffed polysaccharide-based material according to the present invention is a calcium salt and therefore may also serve as a calcium source for dietary purposes.

EXAMPLES

Figure 1:
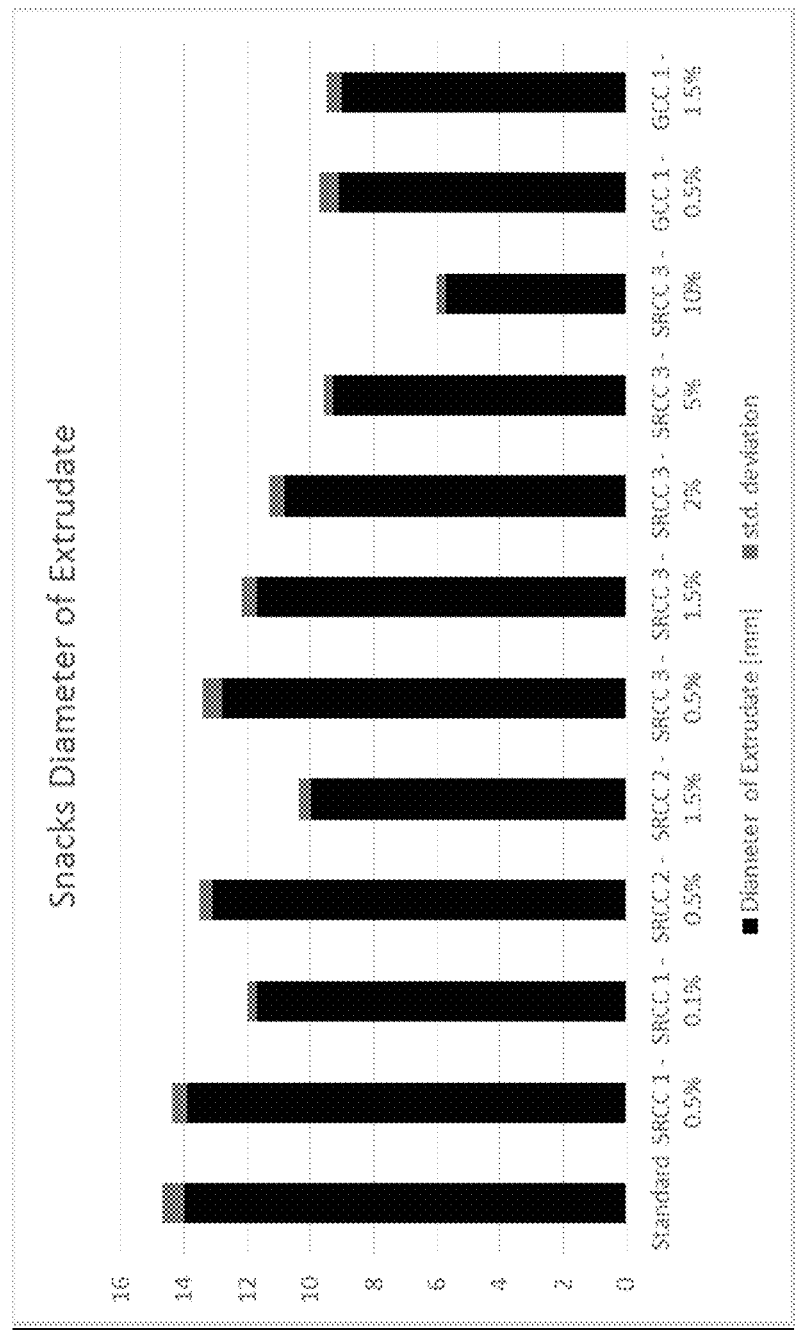
FIG. 1: Diameter of the extrudate (snacks)
Figure 2:
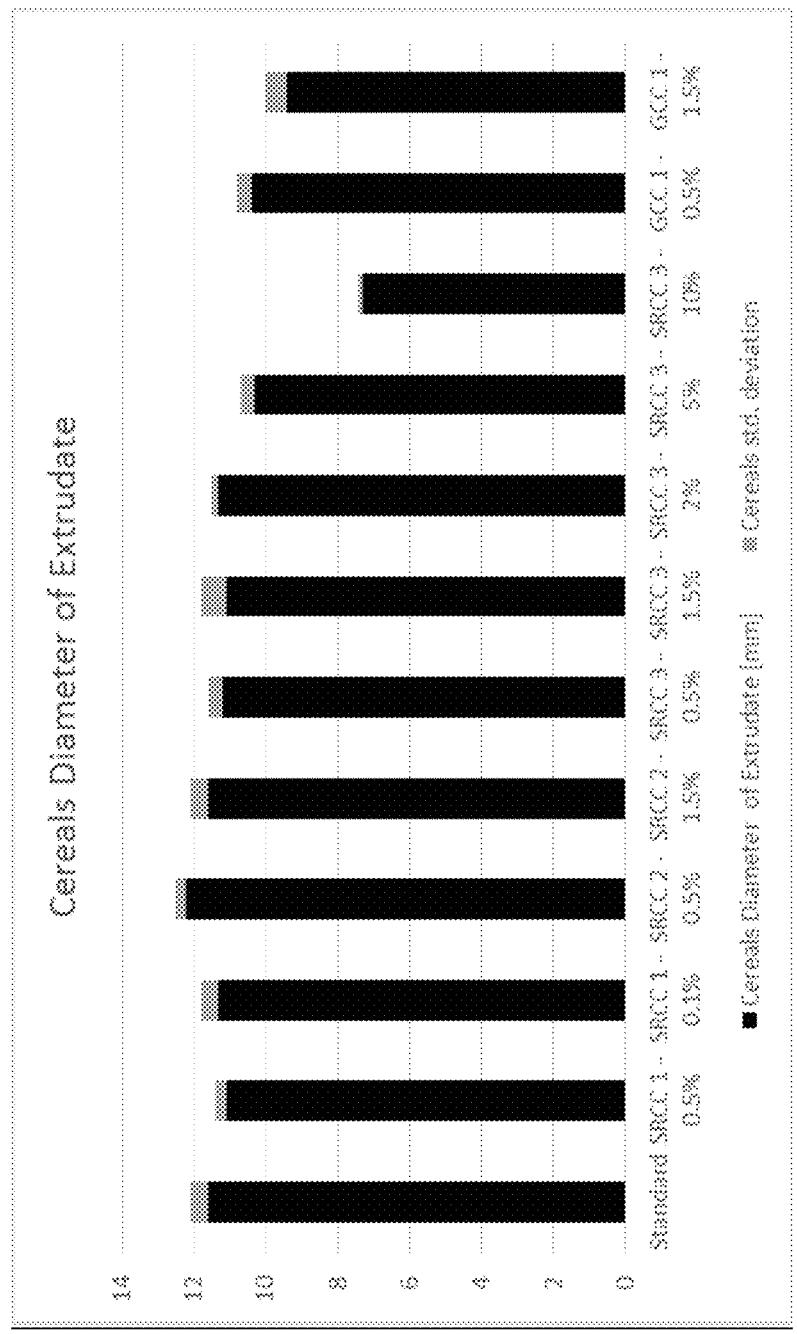
FIG. 2: Diameter of the extrudate (cereals)
Figure 3:
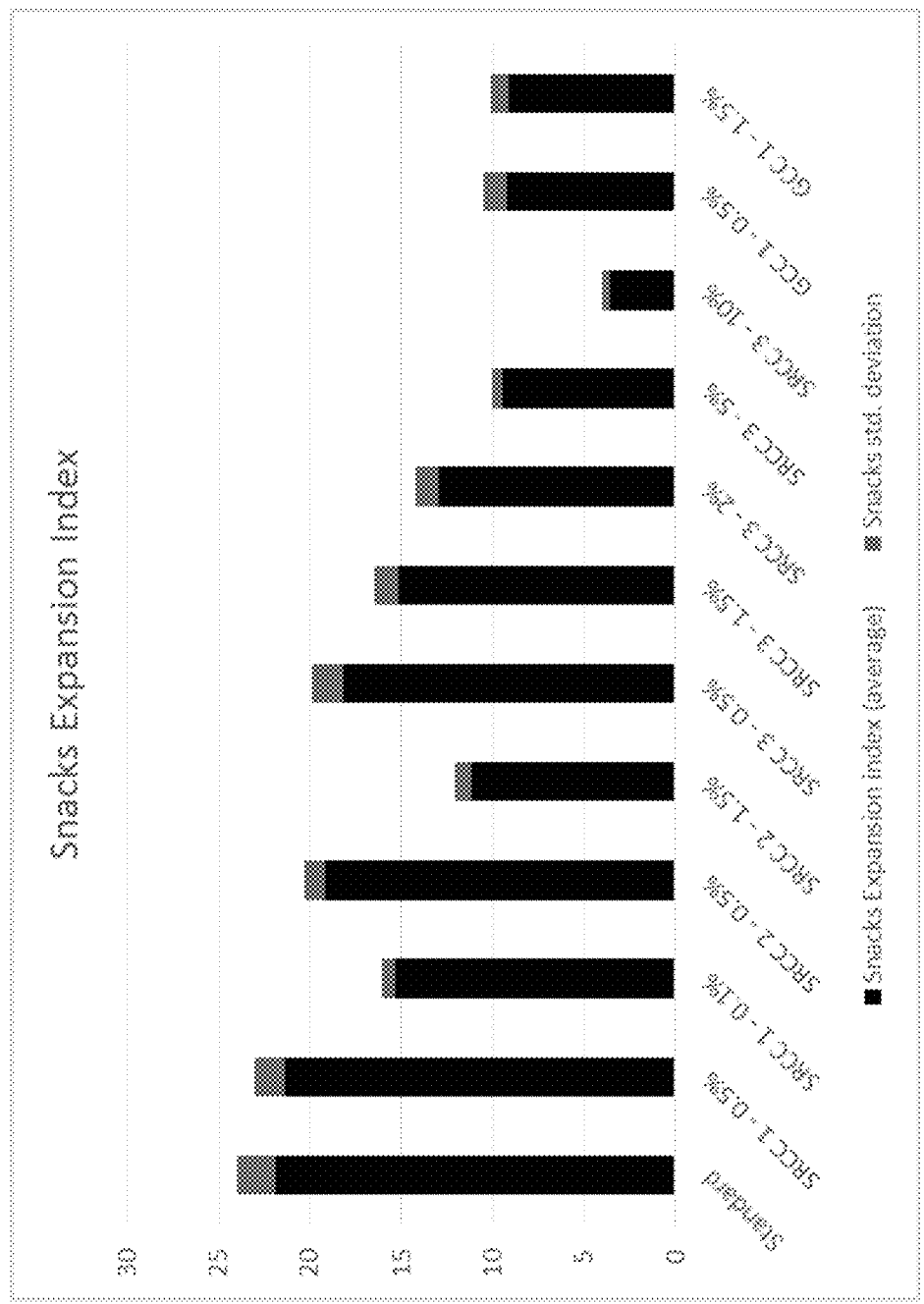
FIG. 3: Expansion index (snacks)
Figure 4:
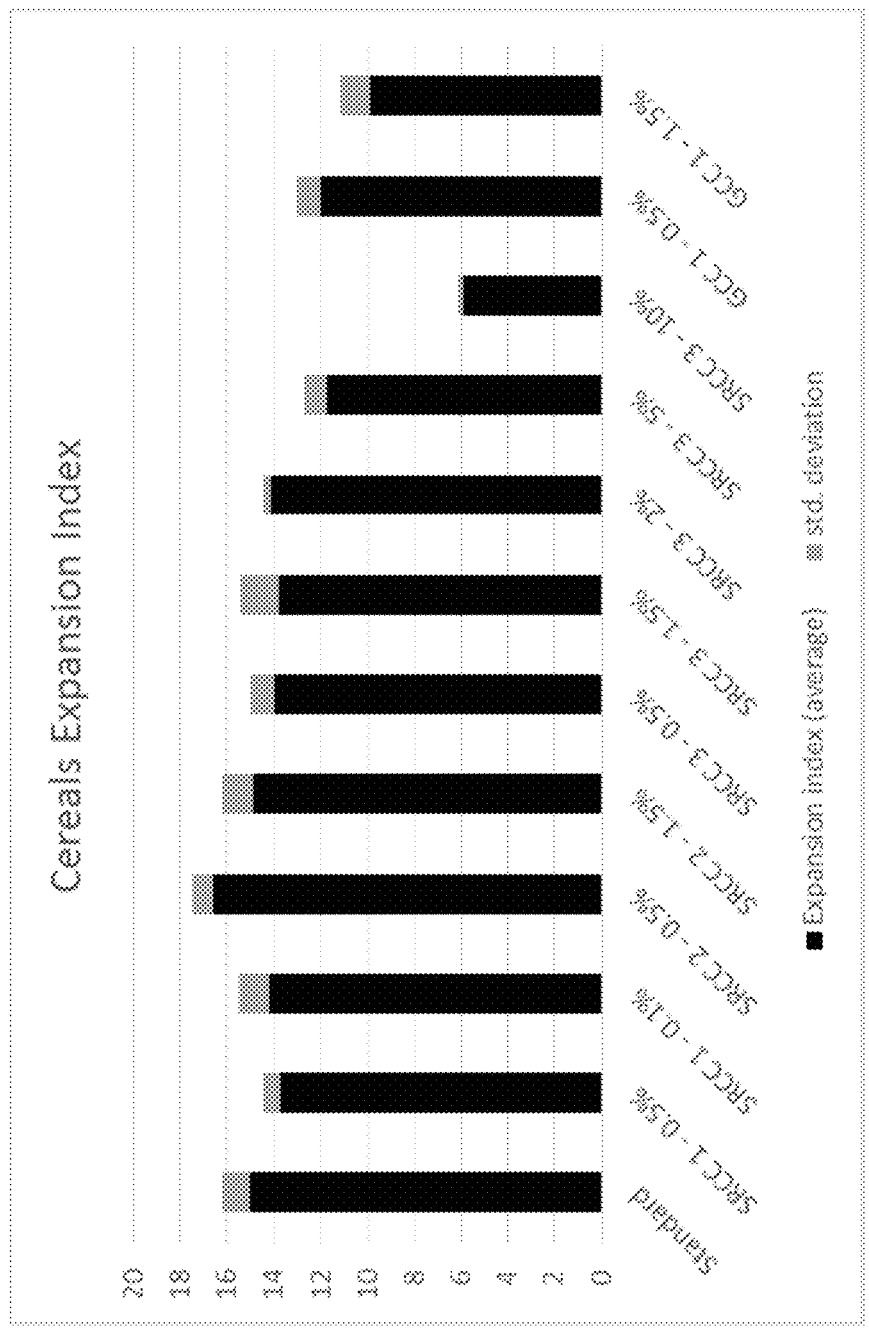
FIG. 4: Expansion index (cereals)

The scope and interest of the invention may be better understood on basis of the following examples which are intended to illustrate embodiments of the present invention. However, they are not to be construed to limit the scope of the claims in any manner whatsoever.

(a) Measuring Methods

In the following, the measuring methods for the parameters defined in the present application and used in the following examples are described.

Particle Size Distribution

The volume determined median particle size $d_{50}$ (vol) and the volume determined top cut particle size $d_{98}$ (vol) were evaluated using a Malvern Mastersizer 2000 Laser Diffraction System (Malvern Instruments Plc., Great Britain). The raw data obtained by the measurement was analysed using the Fraunhofer theory without specified refractive index, with an absorption index of 0.005. The methods and instruments are known to the skilled person and are commonly used to determine particle size distributions of fillers and pigments.

Particle Size Distribution

The weight determined median particle size $d_{50}$ (wt) was measured by the sedimentation method, which is an analysis of sedimentation behaviour in a gravimetric field. The measurement was made with a Sedigraph™ 5120 of Micromeritics Instrument Corporation, USA. The method and the instrument are known to the skilled person and are commonly used to determine particle size distributions of fillers and pigments. The measurement was carried out in an aqueous solution of 0.1 wt.-% $Na_4P_2O_7$. The samples were dispersed using a high speed stirrer and sonicated.

Specific Surface Area (SSA)

The specific surface area was measured via the BET method according to ISO 9277:1995 using nitrogen, following conditioning of the sample by heating at 250° C. for a period of 30 minutes. Prior to such measurements, the sample was filtered within a Buchner funnel, rinsed with deionised water and dried overnight at 90 to 100° C. in an oven. Subsequently, the dry cake was ground thoroughly in a mortar and the resulting powder was placed in a moisture balance at 130° C. until a constant weight was reached.

Intra Particle Intruded Specific Pore Volume (in $cm^3/g$)

The specific pore volume was measured using a mercury intrusion porosimetry measurement using a Micromeritics Autopore V 9620 mercury porosimeter having a maximum applied pressure of mercury 414 MPa (60 000 psi), equivalent to a Laplace throat diameter of 0.004 μm. The equilibration time used at each pressure step was 20 seconds. The sample material was sealed in a 5 $cm^3$ chamber powder penetrometer for analysis. The data were corrected for mercury compression, penetrometer expansion and sample material compression using the software Pore-Comp (Gane, P. A. C., Kettle, J. P., Matthews, G. P. and Ridgway, C. J., "Void Space Structure of Compressible Polymer Spheres and Consolidated Calcium Carbonate Paper-Coating Formulations", Industrial and Engineering Chemistry Research, 35(5), 1996, pp. 1753-1764).

Expansion Index

The expansion index F is a measure to describe the cross-sectional expansion of an extrudate after passing the outlet of an extruder. The expansion index used herein is defined as:

$$F=(D_E/D_D)^2$$

wherein $D_E$ denotes the diameter of the extrudate and $D_D$ denotes the nozzle diameter or the corresponding hole diameter of the die at the extruder outlet. Extrudate diameters were measured using a caliper. A high expansion index thus indicates a higher porosity and a lower density of the extrudate.

Crispness (TA.HDplus Texture Analyser)

Samples are weighed so that equally defined portions are obtained. The amount must be such that at least half of the Kramer shear cell is filled volumetrically. The Kramer shear cell simulates a single bite on a sample and thus provides information about bite-behaviour, crispness and consistency. The 10 blades are moved with constant velocity through the sample, compressing, shearing and extruding the sample through the slotted base plate. Measuring of multiple blades at the same time results in measuring at different places in the sample (resistance in Newtons) for levelling out local structural differences. Measuring parameters are set out in the table below.

| T.A. Settings & Parameters |
|---|
| Type of test: pressure |
| Velocity for: 10.00 mm/s |
| Velocity test: 8.00 mm/s |
| Velocity back: 10.00 mm/s |
| Target parameter: strain |
| Strength: 100.0 g |
| Path: 5.000 mm |
| Strain: 105.0% |
| Release: AUTO (force) |
| Release force: 5.0 g |
| Tool: HDP/KS10; KRAMER SHEAR CELL 10 BLADE |
| Charge: C-DP-0749-0.5% |
| Measuring points per second: 500 |

(b) Extrusion Aids

The following mineral materials are used as extrusion aids or as corresponding reference materials.

Surface-Reacted Calcium Carbonate 1 (SRCC1)

SRCC1 had a $d_{50}$ (vol)=6.6 μm, $d_{98}$ (vol)=15.1 μm, SSA=144 m$^2$/g with an intra-particle intruded specific pore volume of 0.811 cm$^3$/g (for the pore diameter range of 0.004 to 0.23 μm).

SRCC1 was obtained by preparing 450 litres of an aqueous suspension of ground calcium carbonate in a mixing vessel by adjusting the solids content of a ground marble calcium carbonate from Hustadmarmor, Norway, having a mass based median particle size distribution of 90% less than 2 μm, as determined by sedimentation, such that a solids content of 16 wt.-%, based on the total weight of the aqueous suspension, is obtained.

Whilst mixing the slurry, 47.1 kg phosphoric acid were added in form of an aqueous solution containing 30 wt.-% phosphoric acid to said suspension over a period of 15 minutes at a temperature of 70° C. After the addition of the acid, the slurry was stirred for additional 5 minutes, before removing it from the vessel and drying.

Surface-Reacted Calcium Carbonate 2 (SRCC2)

SRCC2 had a $d_{50}$ (vol)=2.98 μm, $d_{98}$ (vol)=10.64 μm, SSA=97.55 m$^2$/g with an intra-particle intruded specific pore volume of 0.723 cm$^3$/g (for the pore diameter range of 0.004 to 0.18 μm).

SRCC2 was obtained by preparing 10 litres of an aqueous suspension of ground calcium carbonate in a mixing vessel by adjusting the solids content of a ground limestone calcium carbonate from Omya SAS, Orgon, having a mass based median particle size distribution of 90% less than 1 μm, as determined by sedimentation, such that a solids content of 10 wt.-%, based on the total weight of the aqueous suspension, is obtained.

Whilst mixing the slurry, 2.7 kg phosphoric acid was added in form of an aqueous solution containing 20 wt.-% phosphoric acid to said suspension over a period of 44 minutes at a temperature of 70° C. After the addition of the acid, the slurry was stirred for additional 5 minutes, before removing it from the vessel and drying.

Surface-Reacted Calcium Carbonate 3 (SRCC3)

SRCC3 had a $d_{50}$ (vol)=6.13 μm, $d_{98}$ (vol)=15 μm, SSA=55.5 m$^2$/g with an intra-particle intruded specific pore volume of 0.739 cm$^3$/g (for the pore diameter range of 0.004 to 0.41 μm).

Starting Material: Limestone

A calcium carbonate suspension is prepared by adding water and undispersed limestone (ground under wet conditions in water, optionally in the presence of a food approved dispersing or grinding aid such as monopropyleneglycol (MPG)) having a $d_{50}$ (wt) of 3 μm, wherein 33 wt.-% of particles have a diameter of less than 2 μm in a 20 L stainless steel reactor, such that the aqueous suspension obtained has a solids content corresponding to 16 wt.-% by dry weight relative to the total suspension weight. The temperature of this suspension is thereafter is brought to and maintained at 70° C. Under stirring at approximately 1 000 rpm such that an essential laminar flow is established, phosphoric acid in the form of a 30% solution is added to the calcium carbonate suspension through a separate funnel over a period of 10 minutes in an amount corresponding to 30% by weight on dry calcium carbonate weight. Following this addition, the suspension is stirred for an additional 5 minutes. The resulting suspension was allowed to settle overnight, and the SRCC had a specific surface area of 36 m$^2$/g, a $d_{50}$ (vol) of 9.3 μm (Malvern) and $d_{98}$ (vol) of 23.5 μm (Malvern).

Starting Material: Marble

A calcium carbonate suspension is prepared by adding water and undispersed marble (ground under wet conditions in water, optionally in the presence of a food approved dispersing or grinding aid such as monopropyleneglycol (MPG)) having a $d_{50}$ (wt) of 3.5 μm, wherein 33 wt.-% of particles have a diameter of less than 2 μm in a 20 L stainless steel reactor, such that the aqueous suspension obtained has a solids content corresponding to 16 wt.-% by dry weight relative to the total suspension weight. The temperature of this suspension is thereafter is brought to and maintained at 70° C. Under stirring at approximately 1 000 rpm such that an essential laminar flow is established, phosphoric acid in the form of a 30% solution is added to the calcium carbonate suspension through a separate funnel over a period of 10 minutes in an amount corresponding to 30% by weight on dry calcium carbonate weight. Following this addition, the suspension is stirred for an additional 5 minutes. The resulting suspension was allowed to settle overnight, and the SRCC had a specific surface area of 46 m$^2$/g, a $d_{50}$ (vol) of 9.5 μm (Malvern) and $d_{98}$ (vol) of 18.9 μm (Malvern).

Starting Material: Marble

A calcium carbonate suspension is prepared by adding water and undispersed marble of (ground under wet conditions in water, optionally in the presence of a food approved dispersing or grinding aid such as monopropyleneglycol (MPG)) having a $d_{50}$ (wt) of 2 μm in a 20 L stainless steel reactor, such that the aqueous suspension obtained has a solids content corresponding to 16 wt.-% by dry weight relative to the total suspension weight. The temperature of this suspension is thereafter is brought to and maintained at 70° C. Under stirring at approximately 1 000 rpm such that an essential laminar flow is established phosphoric acid in the form of a 30% solution is added to the calcium carbonate suspension through a separate funnel over a period of 10 minutes in an amount corresponding to 50% by weight on dry calcium carbonate weight. Following this addition, the suspension is stirred for an additional 5 minutes. The resulting suspension was allowed to settle overnight, and the SRCC had a specific surface area of 71 m$^2$/g, a d$_{50}$ (vol) of 10.6 μm (Malvern) and d$_{98}$ (vol) of 21.8 μm (Malvern).

Ground Natural Calcium Carbonate (GNCC1)

GNCC1 was a food-grade high purity natural calcium carbonate, commercially available from Omya International AG, Switzerland, d$_{50}$ (wt)=5.5 μm.

(c) Examples: Snack and Cereal Extrusion

For the purpose of the following examples, commercially available standard corn flour was purchased from Bäko eG, Germany. Roland Mehl Typ 550 and Grüner Roland Typ 1050 were used as wheat cereals and were purchased from Bremer Rolandmühle Erling GmbH & Co. KG, Germany.

(i) Equipment

Twin-screw extruder DNDL-44, from Bühler AG, Uzwil, Switzerland, with the following parts:

Housing:
  Number of housings: 5 (where 4 D=0.176 m)
  Housings separately or connectedly heatable or coolable
  Heating medium: steam
  Cooling medium: water
  Processing length: 20 D (1 D=0.044 m)

Screw:
  Twin-screw
  Worm gear shaft rotating in the same direction
  Twin-screw diameter: 44 mm
  Twin-screw length (without coupling): 0.88 m (corresponds to 20 D)
  Screw speed: 60 to 450 rpm
  Standard screw configuration:

| | Feeder | | Mixing | Conv. | Pressure | Temp. | Shear Zone | | | |
|---|---|---|---|---|---|---|---|---|---|---|
| Amount/Dir. | /// | / | \\ | / | /// /// | // // | \ | / | \ | /// |
| Gradient [°] | 66 | 44 | poly | 66 | 44 | 33 | 44 | 44 | 44 | 33 |
| Length [mm] | 66 | 44 | 20 | 66 | 44 | 33 | 15 | 15 | 15 | 33 |
| Offset [°] | — | — | — | — | 0 | 0 | 90 | 90 | 90 | 90 |

The feeder zone consisted of 3 elements DNDL 66/R66 and 1 element DNDL 44/R44, the mixing zone consisted of 2 elements of DNDL P45-4/L20, the conveying zone consisted of 1 element of DNDL 66/R66, the pressure zone consisted of 6 elements of DNDL 44/R44e, the temperature zone consisted of 4 elements of DNDL 33/R33, and the shear zone consisted of 6 elements: 1 element of DNDL 44/L14.7, 1 element of DNDL 44/R14.7, 1 element of DNDL 44/L14.7 and 3 elements of DNDL 33/L33.

Cutting Device:
  Movable
  Cutter head with 4 blades

Extrusion Dies:

| Die form | Hole diam. | Cross-sect. area | Die form | Hole diam. | Cross-sect. area |
|---|---|---|---|---|---|
| 2 × 1-hole | 3.3 mm | 17.1 mm$^2$ | 1 × 2-hole | 3.0 mm | 14.1 mm$^2$ |
| 2 × 1-hole | 5.0 mm | 39.2 mm$^2$ | 1 × 2-hole | star shaped | ca. 60 mm$^2$ |
| 2 × 6-hole | 3.0 mm | 84.8 mm$^2$ | | | |
| 2 × 10-hole | 2.0 mm | 62.8 mm$^2$ | 1 × 2-hole (tube) | 3.0 mm 2.0 mm | 3.9 mm$^2$ |
| 2 × 12-hole | 1.0 mm | 18.8 mm$^2$ | | | |

Feed (Product Feed):
  Twin-screw feed device
  Volumetric feed (metering unit with container)

(ii) Process and Product Parameters: Snacks
  Product: snacks
  Final screw: cone-shaped
  Die: 1×2-hole (diameter: 3 mm)
  Recipe:

| | Ingredients | Corn flour | Sugar | Salt | SRCC | Total |
|---|---|---|---|---|---|---|
| Standard | Amount % | 98.00 | 1.00 | 1.00 | 0.00 | 100.00 |
| | Amount kg | 29.40 | 0.30 | 0.30 | 0.00 | 30.00 |
| SRCC 0.5% | Amount % | 97.50 | 1.00 | 1.00 | 0.50 | 100.00 |
| | Amount kg | 14.63 | 0.15 | 0.15 | 0.08 | 15.00 |
| SRCC 1.5% | Amount % | 96.50 | 1.00 | 1.00 | 1.50 | 100.00 |
| | Amount kg | 14.48 | 0.15 | 0.15 | 0.23 | 15.00 |
| SRCC 2.0% | Amount % | 96.00 | 1.00 | 1.00 | 2.00 | 100.00 |
| | Amount kg | 14.40 | 0.15 | 0.15 | 0.30 | 15.00 |
| SRCC 5.0% | Amount % | 93.00 | 1.00 | 1.00 | 5.00 | 100.00 |
| | Amount kg | 13.95 | 0.15 | 0.15 | 0.75 | 15.00 |
| SRCC 10.0% | Amount % | 88.00 | 1.00 | 1.00 | 10.00 | 100.00 |
| | Amount kg | 13.20 | 0.15 | 0.15 | 1.50 | 15.00 |

Process parameters:

| | Sample No. | | | | |
|---|---|---|---|---|---|
| | Standard | SRCC1 0.5% | SRCC1 1.5% | SRCC2 0.5% | SRCC2 1.5% |
| Torque [%] | 44 | 46 | 52 | 47 | 47 |
| Speed [%] | 50 | 50 | 50 | 50 | 50 |
| Blade speed [%] | 33 | 33 | 33 | 33 | 33 |
| H$_2$O addition [kg/h] | 3.9 | 3.9 | 3.9 | 3.9 | 3.9 |
| Product dosing [kg/h] | 33 | 33 | 33 | 33 | 33 |
| Pressure [bar] | 45-50 | 45-50 | 50 | 45-50 | 45-50 |
| Temp. module 2 [° C.] | 100 | 100 | 100 | 100 | 100 |
| Temp. module 3 [° C.] | 110 | 110 | 110 | 110 | 110 |
| Temp. module 4 [° C.] | 125 | 125 | 125 | 125 | 125 |
| Temp. module 5 [° C.] | 125 | 125 | 125 | 125 | 125 |

|  | Sample No. | | | | |
| --- | --- | --- | --- | --- | --- |
|  | SRCC3 0.5% | SRCC3 1.5% | SRCC3 2.0% | SRCC3 5.0% | SRCC3 10.0% |
| Torque [%] | 46 | 49 | 50 | 54 | 67 |
| Speed [%] | 50 | 50 | 50 | 50 | 50 |
| Blade speed [%] | 33 | 33 | 33 | 33 | 33 |
| H$_2$O addition [kg/h] | 3.9 | 3.9 | 3.9 | 3.9 | 3.9 |
| Product dosing [kg/h] | 33 | 33 | 33 | 33 | 33 |
| Pressure [bar] | 45-50 | 50 | 51 | 51-55 | 30 |
| Temp. module 2 [° C.] | 100 | 100 | 100 | 100 | 100 |
| Temp. module 3 [° C.] | 110 | 110 | 110 | 110 | 110 |
| Temp. module 4 [° C.] | 125 | 125 | 125 | 125 | 125 |
| Temp. module 5 [° C.] | 125 | 125 | 125 | 125 | 125 |

(iii) Process and Product Parameters: Cereals
Product: cereals
Final screw: cone-shaped
Die: 1×2-hole (diameter: 3 mm)
Recipe:

|  | Ingredients | Wheat flour | Wheat whole grain | Sugar | Salt | SRCC | Total |
| --- | --- | --- | --- | --- | --- | --- | --- |
| Standard | Amount % | 82.50 | 10.00 | 7.00 | 0.50 | 0.00 | 100.00 |
|  | Amount kg | 24.75 | 3.00 | 2.10 | 0.15 | 0.00 | 30.00 |
| SRCC 0.5% | Amount % | 82.00 | 10.00 | 7.00 | 0.50 | 0.50 | 100.00 |
|  | Amount kg | 12.30 | 1.50 | 1.05 | 0.08 | 0.08 | 15.00 |
| SRCC 1.5% | Amount % | 81.00 | 10.00 | 7.00 | 0.50 | 1.50 | 100.00 |
|  | Amount kg | 12.15 | 1.50 | 1.05 | 0.08 | 0.23 | 15.00 |
| SRCC 2.0% | Amount % | 80.50 | 10.00 | 7.00 | 0.50 | 2.00 | 100.00 |
|  | Amount kg | 12.08 | 1.50 | 1.05 | 0.08 | 0.30 | 15.00 |
| SRCC 5.0% | Amount % | 78.50 | 10.00 | 7.00 | 0.50 | 5.00 | 100.00 |
|  | Amount kg | 11.78 | 1.50 | 1.05 | 0.08 | 0.75 | 15.00 |
| SRCC 10.0% | Amount % | 72.78 | 10.00 | 7.00 | 0.50 | 10.00 | 100.00 |
|  | Amount kg | 10.88 | 1.50 | 1.05 | 0.08 | 1.50 | 15.00 |

Process parameters:

|  | Sample No. | | | | |
| --- | --- | --- | --- | --- | --- |
|  | Standard | SRCC1 0.5% | SRCC1 1.5% | SRCC2 0.5% | SRCC2 1.5% |
| Torque [%] | 40 | 55 | 57 | 54 | 53 |
| Speed [%] | 52 | 52 | 52 | 52 | 52 |
| Blade speed [%] | 34 | 34 | 34 | 34 | 34 |
| H$_2$O addition [kg/h] | 1.2 | 1.2 | 1.2 | 1.2 | 1.2 |
| Product dosing [kg/h] | 35 | 35 | 35 | 35 | 35 |
| Pressure [bar] | 41 | 53 | 55-60 | 55 | 55 |
| Temp. module 2 [° C.] | 100 | 100 | 100 | 100 | 100 |
| Temp. module 3 [° C.] | 110 | 110 | 110 | 110 | 110 |
| Temp. module 4 [° C.] | 125 | 125 | 125 | 125 | 125 |
| Temp. module 5 [° C.] | 135 | 135 | 135 | 135 | 135 |

|  | Sample No. | | | | |
| --- | --- | --- | --- | --- | --- |
|  | SRCC3 0.5% | SRCC3 1.5% | SRCC3 2.0% | SRCC3 5.0% | SRCC3 10.0% |
| Torque [%] | 46 | 51 | 54 | 56 | 54 |
| Speed [%] | 52 | 52 | 52 | 52 | 52 |
| Blade speed [%] | 34 | 34 | 34 | 34 | 34 |
| H$_2$O addition [kg/h] | 1.2 | 1.2 | 1.2 | 1.2 | 1.2 |
| Product dosing [kg/h] | 35 | 35 | 35 | 35 | 35 |
| Pressure [bar] | 48 | 42 | 53 | 54 | 38 |
| Temp. module 2 [° C.] | 100 | 100 | 100 | 100 | 100 |
| Temp. module 3 [° C.] | 110 | 110 | 110 | 110 | 110 |
| Temp. module 4 [° C.] | 125 | 125 | 125 | 125 | 125 |
| Temp. module 5 [° C.] | 135 | 135 | 135 | 135 | 135 |

(d) Results

Figure 5:
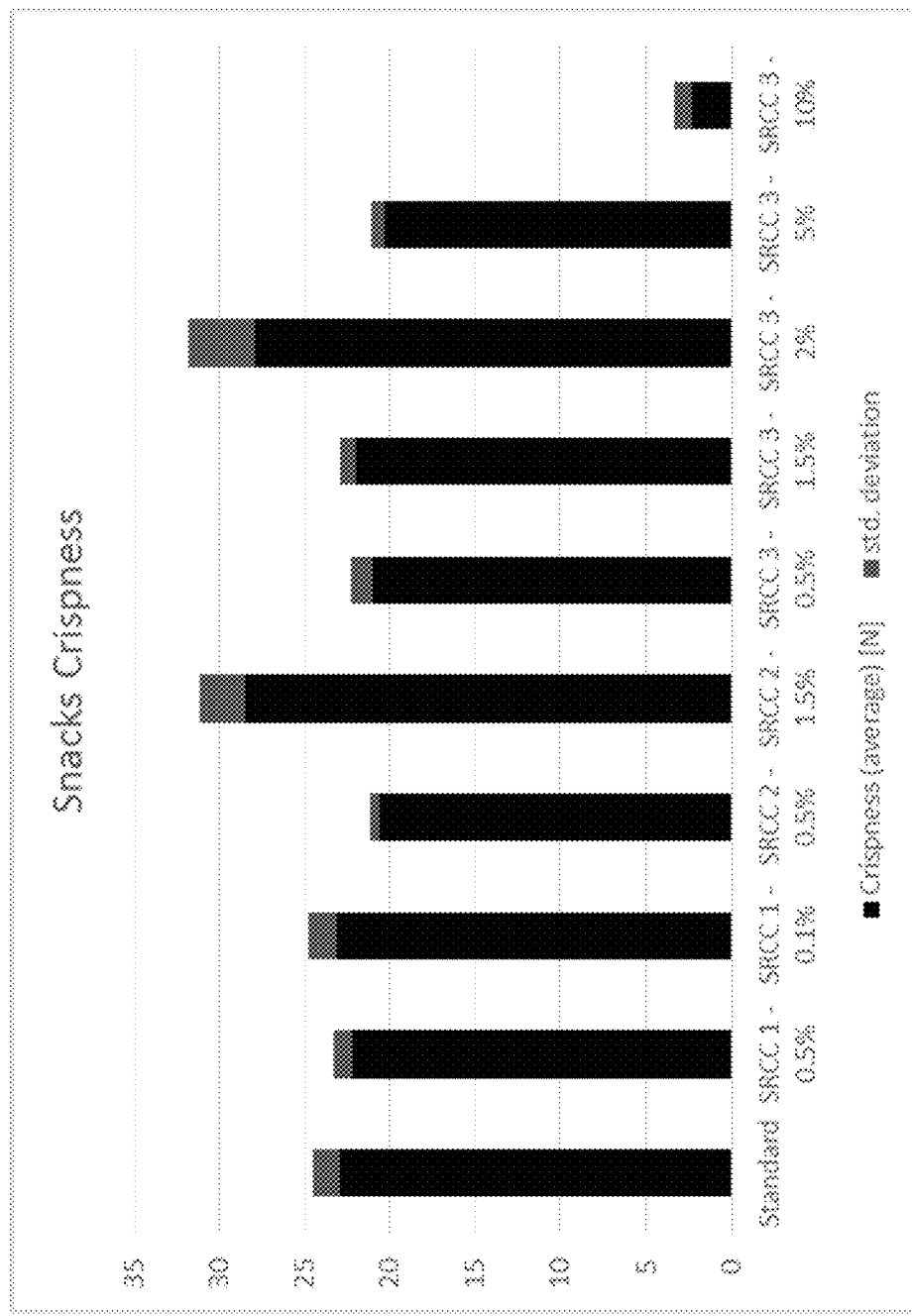
FIG. 5: Crispness (snacks)

FIGS. 1 to 5 show the results for the diameter of the extrudate (FIG. 1: snacks, FIG. 2: cereals), the expansion index (FIG. 3: snacks, FIG. 4: cereals), and the crispness of snacks (FIG. 5).

Figure 6:
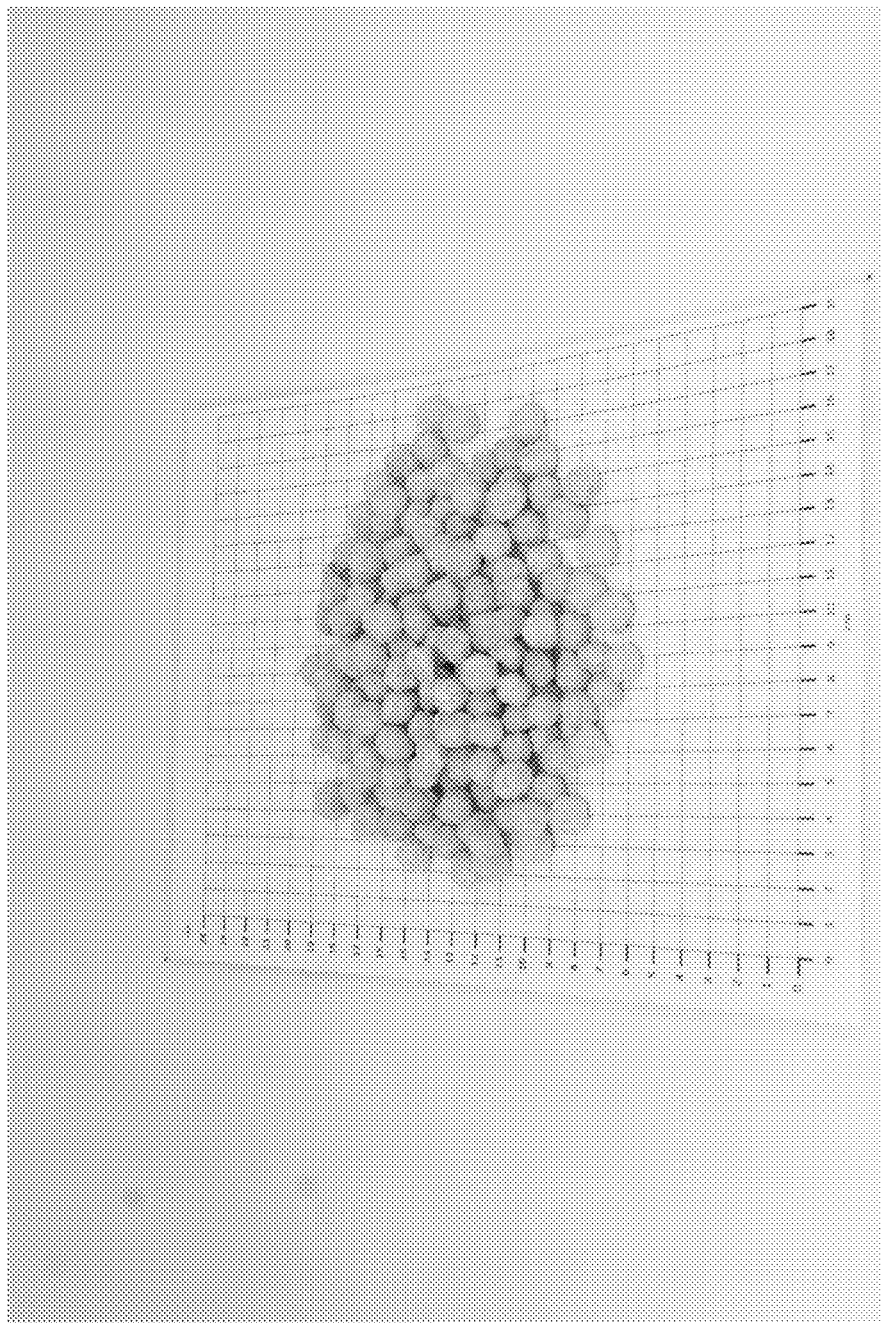
FIG. 6: Photograph of extrudate (standard cereal)
Figure 7:
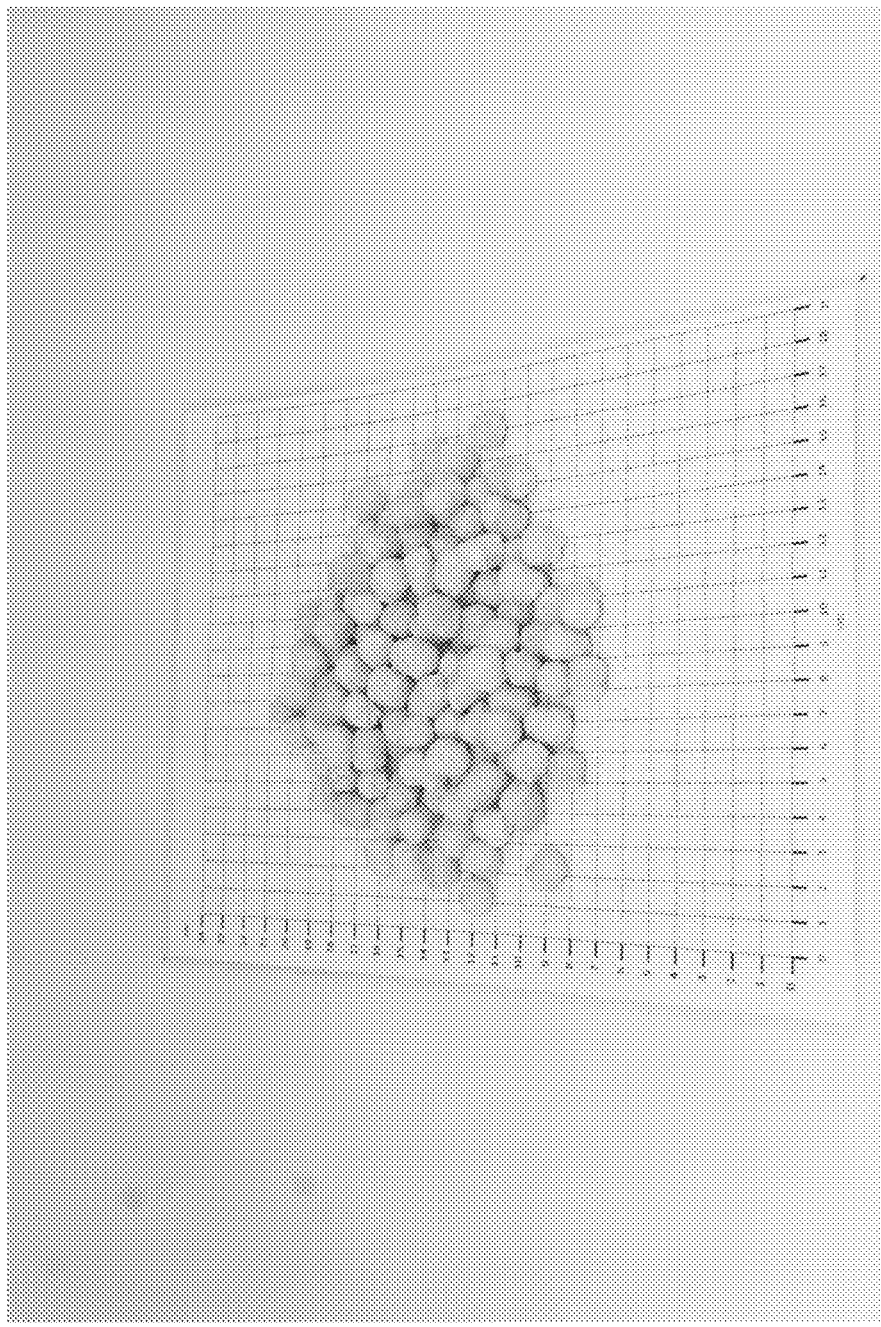
FIG. 7: Photograph of extrudate (cereals prepared with 0.5% of SRCC2)

FIGS. 6 and 7 show photographs of standard cereals (FIG. 6) and of cereals prepared in the presence of 0.5% SRCC2 (FIG. 7).

Figure 8:
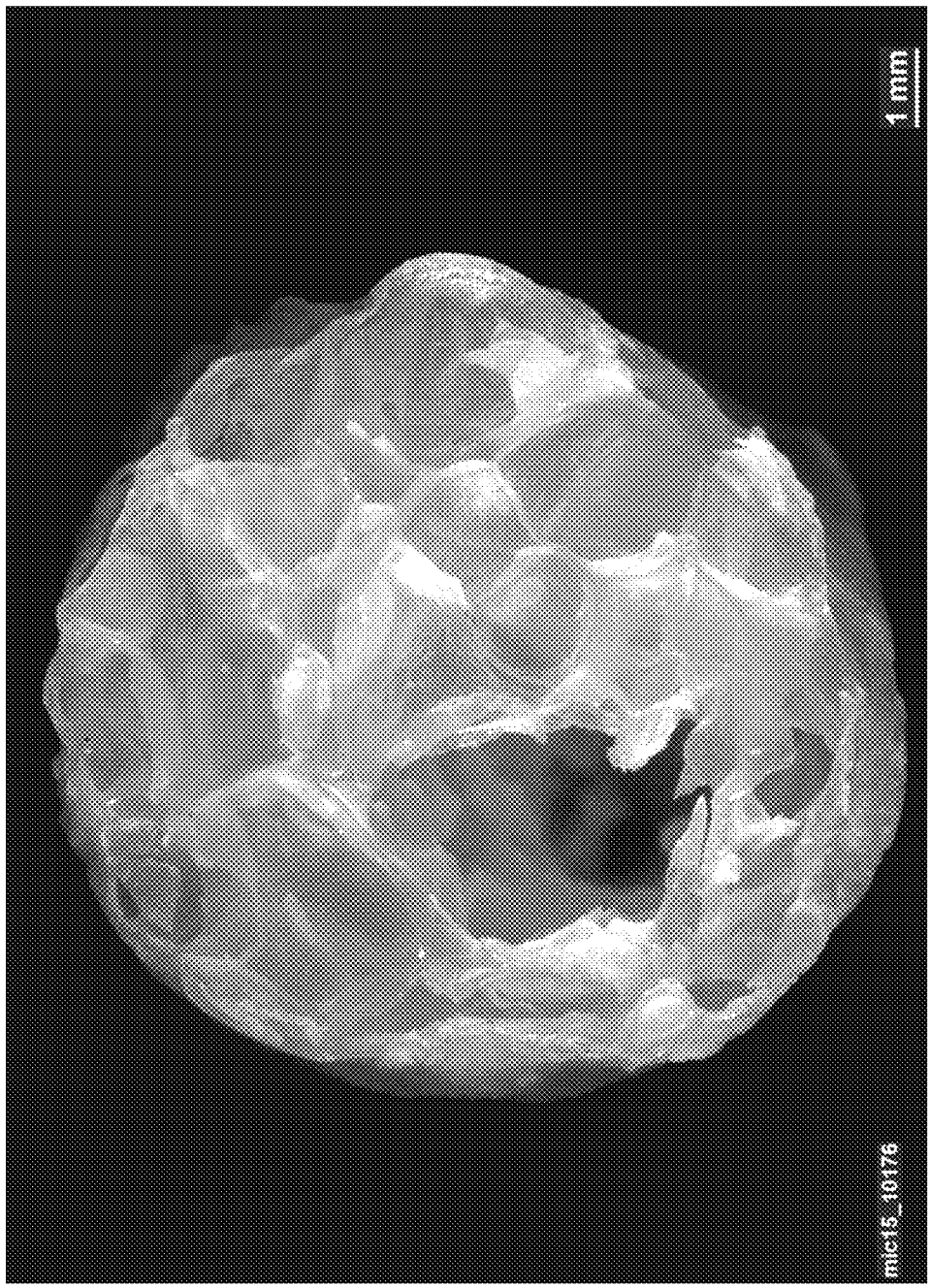
FIG. 8: Stereo microscope (SM) image of the cross section of extrudate (standard snack)
Figure 9:
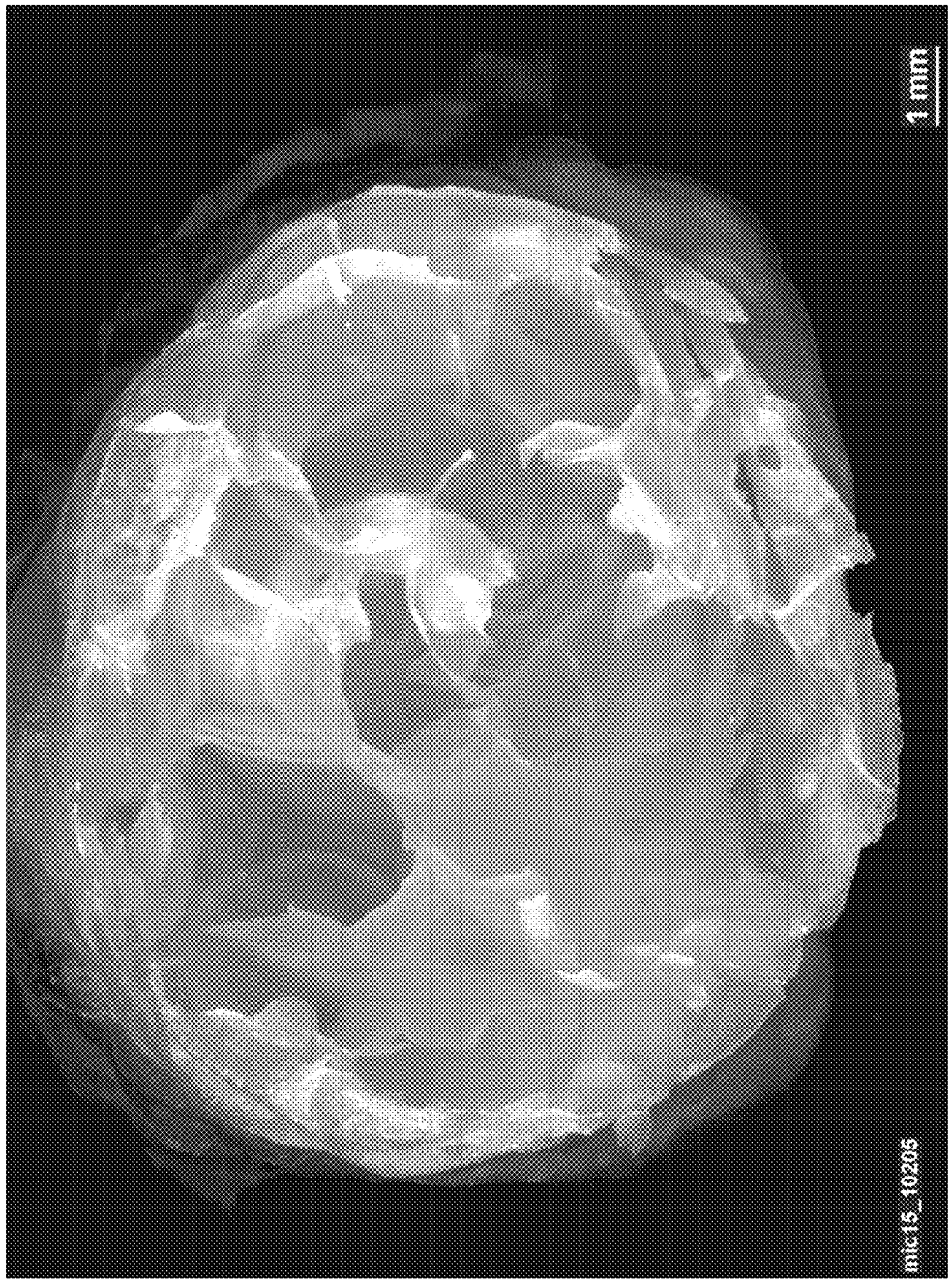
FIG. 9: Stereo microscope (SM) image of the cross section of extrudate (cereals prepared with 0.5% of SRCC3)

FIGS. 8 and 9 show stereo microscope (SM) images of the cross section of a standard snack (FIG. 8) and of a snack that was prepared in the presence of SRCC3-0.5% (FIG. 9). The images were made with a Leica MZ16A stereo microscope and a Leica DFC 320 camera and angled light illumination to show the structure of the samples.

Organoleptic panel tests were carried out for the produced snacks as well as for the produced cereals. The organoleptic panel consisted of 6 persons, all trained according to DIN 10961. Tables 1 and 2 show the results obtained for snacks and cereals, respectively.

TABLE 1 results of organoleptic panel test for snacks

|  | Colour | Surface | Crispness | Bite |
|---|---|---|---|---|
| Standard | yellow | hard | very crispy | fluffy, sharp-edged |
| SRCC1 0.5% | yellow | slightly finer | Crispy | fluffy, sharp-edged |
| SRCC1 1.5% | yellow | finer | crispy | fluffy, sharp-edged |
| SRCC2 0.5% | yellow | coarser | crispy | fluffy, sharp-edged |
| SRCC2 1.5% | yellow | finer | crispy | fluffy |
| SRCC3 0.5% | yellow | coarser | crispy | fluffy |
| SRCC3 1.5% | yellow | coarser | crispy | fluffy |
| SRCC3 2.0% | brighter | finer | less crispy | less sharp-edged |
| SRCC3 5.0% | brighter | very fine | not at all crispy | fast gone |
| SRCC3 10.0% | much brighter | very fine | not at all crispy | sticky, adherent |

|  | Mouthfeel | Chewing impression | Taste | Smell |
|---|---|---|---|---|
| Standard | sticky | first airy, then sticky | corn | corn, neutral |
| SRCC1 0.5% | more sticky | sticky | corn | corn, neutral |
| SRCC1 1.5% | more sticky | sticky | corn | corn, neutral |
| SRCC2 0.5% | more sticky | sticky | corn | corn, neutral |
| SRCC2 1.5% | less sticky | sticky, cross | corn | corn, neutral |
| SRCC3 0.5% | sticky | very airy | corn | corn, neutral |
| SRCC3 1.5% | sticky | airy, sticky | corn | corn, neutral |
| SRCC3 2.0% | sticky | less airy | slightly salty | corn, neutral |
| SRCC3 5.0% | sticky | floury | corn | corn, neutral |
| SRCC3 10.0% | shrill | sticky, paste-like | neutral | sweet |

TABLE 2 results of organoleptic panel test for cereals

|  | Colour | Surface | Crispness | Bite |
|---|---|---|---|---|
| Standard | slightly brownish | uneven | crispy, fast gone | fast gone |
| SRCC1 0.5% | brighter | more uniform | more crispy | faster gone |
| SRCC1 1.5% | brighter | more uniform | more crispy | faster gone |
| SRCC2 0.5% | standard | slightly uneven | crispy, fast gone | more crispy |
| SRCC2 1.5% | brighter | relatively fine | more crispy | 3 to 4 times to chew |
| SRCC3 0.5% | standard | uneven | standard | standard |
| SRCC3 1.5% | brighter | more uniform | crispy, fast gone | 1 to 2 times to chew |
| SRCC3 2.0% | brighter | more uniform | no difference | no difference |
| SRCC3 5.0% | brighter | uniformly rough | crispy, very fast gone | fast gone |
| SRCC3 10.0% | very bright | very fine pores | crispy | fast gone |

|  | Mouthfeel | Chewing impression | Taste | Smell |
|---|---|---|---|---|
| Standard | sticky, fast gone | sticky, fast gone | whole grain | roasty |
| SRCC1 0.5% | sticks at teeth | sticks at teeth | whole grain | no difference |
| SRCC1 1.5% | dryer | dryer | whole grain | no difference |
| SRCC2 0.5% | standard | longer crispy | whole grain | no difference |
| SRCC2 1.5% | hygroscopic | hygroscopic | no off-flavour | no difference |
| SRCC3 0.5% | standard | crispy, fast gone | no off-flavour | no difference |
| SRCC3 1.5% | slightly stickier | 1 to 2 times to chew | no off-flavour | no difference |
| SRCC3 2.0% | no difference | fast gone | no off-flavour | no difference |
| SRCC3 5.0% | fast gone | fast gone | no off-flavour | no difference |
| SRCC3 10.0% | very sticky, hard | very sticky, hard | like popcorn | no difference |

The results of the present examples indicate an increased expansion index (F) and improved crispness (TA.HDplus Texture Analyser) for the products prepared according to the inventive process compared with the samples prepared from standard calcium carbonate (GNCC1) which were prepared analogously (see FIGS. 1 to 5). Furthermore, the organoleptic panel test revealed improved surface textures and crispness (see the foregoing tables).

The invention claimed is:

1. A process for the production of a puffed polysaccharide-based material, the process comprising the following steps:
   (a) providing at least one polysaccharide-containing ground material, excluding fibrillated cellulose-containing materials;
   (b) providing at least one extrusion aid;
   (c) combining the polysaccharide-containing ground material provided in step (a) and the extrusion aid provided in step (b) to obtain a mixture; and
   (d) puffing the mixture obtained in step (c) by means of an extruder to obtain a puffed polysaccharide-based extrudate;
   wherein the extrusion aid provided in step (b) is a surface-reacted calcium carbonate, wherein the surface-reacted calcium carbonate is a reaction product of ground natural calcium carbonate (GNCC) or precipitated calcium carbonate (PCC) treated with $CO_2$ and one or more $H_3O^+$ ion donors and wherein the $CO_2$ is formed in situ by the $H_3O^+$ ion donors treatment and/or is supplied from an external source wherein the extrusion aid has a specific surface area of from 15 m$^2$/g measured using nitrogen and the BET method according to ISO 9277:1995.

2. The process according to claim 1, wherein:
   (i) the polysaccharide is a homopolysaccharide; and/or
   ii) the polysaccharide-containing ground material provided in step (a) comprises barley, corn (maize), oats, rice, rye, spelt, wheat, amaranth, quinoa, millet or mixtures thereof.

3. The process according to claim 1, wherein the one or more $H_3O^+$ ion donors are selected from the group consisting of:

(i) strong acids having a p$K_a$ of 0 or less at 20° C.; and/or
(ii) medium-strong acids having a p$K_a$ value from 0 to 2.5 at 20° C.; and/or
(iii) weak acids having a p$K_a$ of greater than 2.5 and less than or equal to 7 at 20° C., associated with the ionization of its first available hydrogen, wherein a corresponding anion is formed on loss of this first available hydrogen capable of forming a water-soluble calcium salt, and wherein at least one water-soluble salt, which in the case of a hydrogen-containing salt has a p$K_a$ of greater than 7 at 20° C., associated with the ionization of the first available hydrogen, and the salt anion of which is capable of forming water-insoluble calcium salts, is additionally provided.

4. The process according to claim 1, wherein the surface-reacted calcium carbonate is obtained by a process comprising the following steps:
(a) providing a suspension of ground natural calcium carbonate (GNCC) or precipitated calcium carbonate (PCC);
(b) adding at least one acid having a p$K_a$ value of 0 or less at 20° C., or having a p$K_a$ value from 0 to 2.5 at 20° C. to the suspension provided in step (a); and
(c) treating the suspension provided in step (a) with $CO_2$ before, during or after step (b).

5. The process according to claim 1, wherein the surface-reacted calcium carbonate is obtained by a process comprising the following steps:
(a) providing ground natural calcium carbonate (GNCC) or precipitated calcium carbonate (PCC);
(b) providing at least one water-soluble acid;
(c) providing gaseous $CO_2$; and
(d) contacting said GNCC or PCC provided in step (a), the at least one acid provided in step (b) and the gaseous $CO_2$ provided in step (c);
wherein (i) the at least one acid provided in step (b) has a p$K_a$ of greater than 2.5 and less than or equal to 7 at 20° C., associated with the ionization of its first available hydrogen, and a corresponding anion is formed on loss of this first available hydrogen capable of forming a water-soluble calcium salt; and (ii) following contacting the at least one water-soluble acid provided in step (b) and the GNCC or PCC provided in step (a), at least one water-soluble salt, which in the case of a hydrogen-containing salt has a p$K_a$ of greater than 7 at 20° C., associated with the ionization of the first available hydrogen, and the salt anion of which is capable of forming water-insoluble calcium salts, is additionally provided.

6. The process according to claim 1, wherein:
(i) the natural calcium carbonate is selected from the group consisting of marble, chalk, dolomite, limestone and mixtures thereof; and/or
(ii) the precipitated calcium carbonate comprises aragonitic, vateritic or calcitic mineralogical crystal forms or mixtures thereof.

7. The process according to claim 1, wherein the extrusion aid has:
(i) a volume median grain diameter $d_{50}$(vol) of from 1 μm to 75 μm; and/or
(ii) a volume grain diameter $d_{98}$(vol) of from 2 μm to 150 μm.

8. The process according to claim 1, wherein the mixture obtained in step (c) comprises from 0.01 wt.-% to 10 wt.-% of the extrusion aid provided in step (b), based on the total dry weight of said mixture.

9. The process according to claim 1, wherein in step (d):
(i) the mixture obtained in step (c) is heated to from 100° C. to 150° C.; and/or
(ii) the extruder operates at a minimum pressure of 0.5 MPa; and/or
(iii) the extruder operates at a maximum pressure of 10 MPa.

10. The process according to claim 1, wherein the mixture obtained in step (c) further comprises the following additives:
(i) water; and/or
(ii) whole grains; and/or
(iii) sucrose; and/or
(iv) sodium chloride;
each based on the total dry weight of said mixture.

11. The process according to claim 1, wherein the process further comprises step (e) of processing the puffed polysaccharide-based extrudate obtained in step (d) into:
(i) a food product for human consumption; or
(ii) a food product for animal consumption; or
(iii) a packaging material.

12. An extrusion aid comprising an effective amount of a surface-reacted calcium carbonate for the production of a puffed polysaccharide-based material, excluding fibrillated cellulose-containing materials, wherein the surface-reacted calcium carbonate is a reaction product of ground natural calcium carbonate (GNCC) or precipitated calcium carbonate (PCC) treated with $CO_2$ and one or more $H_3O^+$ ion donors and wherein the $CO_2$ is formed in situ by the $H_3O^+$ ion donors treatment and/or is supplied from an external source wherein the extrusion aid has a specific surface area of from 15 m²/g measured using nitrogen and the BET method according to ISO 9277:1995.

13. The extrusion aid according to claim 12, wherein the aid has:
(i) a volume median grain diameter $d_{50}$(vol) of from 1 μm to 75 μm; and/or
(ii) a volume grain diameter $d_{98}$(vol) of from 2 μm to 150 μm.

14. A puffed polysaccharide-based material, excluding fibrillated cellulose-containing materials, wherein the puffed polysaccharide-based material is prepared by a process comprising the following steps:
(a) providing at least one polysaccharide-containing ground material, excluding fibrillated cellulose-containing materials;
(b) providing at least one extrusion aid;
(c) combining the polysaccharide-containing ground material provided in step (a) and the extrusion aid provided in step (b) to obtain a mixture; and
(d) puffing the mixture obtained in step (c) by means of an extruder to obtain a puffed polysaccharide-based extrudate;
wherein the extrusion aid provided in step (b) is a surface-reacted calcium carbonate,
wherein the surface-reacted calcium carbonate is a reaction product of ground natural calcium carbonate (GNCC) or precipitated calcium carbonate (PCC) treated with $CO_2$ and one or more $H_3O^+$ ion donors,
wherein the $CO_2$ is formed in situ by the $H_3O^+$ ion donors treatment and/or is supplied from an external source, and
wherein the extrusion aid has a specific surface area of from 15 m²/g to 200 m²/g measured using nitrogen and the BET method according to ISO 9277:1995.

15. The puffed polysaccharide-based material according to claim 14, wherein the material provides:

(i) an expansion index F of from 5 to 30; and/or
(ii) a crispness of from 25 N to 50 N measured on a TA.HDplus Texture Analyser from Stable Micro Systems equipped with a Kramer Shear cell with 10 blades.

16. The process according to claim 7, wherein:
(i) the volume medium grain diameter $d_{50}(vol)$ is in a range selected from the group consisting of 1.5 μm to 50 μm, 2 μm to 40 μm, and 2.5 μm to 7.0 μm; and/or
(ii) the volume grain diameter $d_{98}(vol)$ is in a range selected from the group consisting of 4 μm to 100 μm, 6 μm to 80 μm, 8 μm to 60 μm and 10 μm to 30 μm.

17. The process according to claim 1, wherein the specific surface area is in a range selected from the group consisting of 27 m²/g to 180 m²/g, 30 m²/g to 160 m²/g, 45 m²/g to 150 m²/g and 48 m²/g to 140 m²/g.

18. The process according to claim 8, wherein the amount of the extrusion aid is in a range selected from the group consisting of 0.05 wt.-% to 5 wt.-%, 0.1 wt.-% to 2 wt.-% and 0.2 wt.-% to 1.8 wt.-%.

19. The process according to claim 9, wherein:
(i) the mixture obtained in step (c) is heated to a temperature selected from the group consisting of: 105° C. to 140° C., 110° C. to 135° C. and 115° C. to 130° C.; and/or
(ii) the extruder operates at a minimum pressure selected from the group consisting of 2.5 MPa, 3.5 MPa, 5 MPa, 5.5 MPa and 6 MPa; and/or
(iii) the extruder operates at a maximum pressure selected from the group consisting of 8 MPa, 7.5 MPa, 6 MPa and 5 MPa.

20. The process according to claim 10, wherein:
(i) the water is present in an amount selected from the group consisting of 0.01 wt.-% to 15 wt.-%, 0.1 wt.-% to 10 wt.-% and 0.2 wt.-% to 5 wt.-%; and/or
(ii) the whole grains are present in an amount selected from the group consisting of 0.1 wt.-% to 30 wt.-%, 0.5 wt.-% to 20 wt.-% and 1 wt.-% to 15 wt.-%; and/or
(iii) the amount of sucrose is selected from the group consisting of 0.01 wt.-% to 20 wt.-%, 0.1 wt.-% to 10 wt.-% and 0.2 wt.-% to 5 wt.-%; and/or
(iv) the amount of sodium chloride is selected from the group consisting of 0.001 wt.-% to 5 wt.-%, 0.01 wt.-% to 2 wt.-% and 0.1 wt.-% to 1 wt.-%.

21. The extrusion aid according to claim 13, wherein:
(i) the volume medium grain diameter $d_{50}(vol)$ is selected from the group consisting of 1.5 μm to 50 μm, 2 μm to 40 μm, and 2.5 μm to 7.0 μm; and/or
(ii) the volume grain diameter $d_{98}(vol)$ is selected from the group consisting of 4 μm to 100 μm, 6 μm to 60 μm, 8 μm to 60 μm and 10 μm to 30 μm.

22. The extrusion aid according to claim 12, wherein the specific surface area is selected from the group consisting of 27 m²/g to 180 m²/g, 30 m²/g to 160 m²/g, 45 m²/g to 150 m²/g and 48 m²/g to 140 m²/g.

23. The puffed polysaccharide-based material according to claim 15, wherein:
(i) the expansion index F is selected from the group consisting of 8 to 25, 10 to 20, and 12 to 18; and/or
(ii) the crispness is selected from the group consisting of 30 N to 48 N, 32 N to 45 N and 35 N to 40 N.

* * * * *